(12) United States Patent
Smallhorn et al.

(10) Patent No.: US 10,414,669 B2
(45) Date of Patent: Sep. 17, 2019

(54) WATER TREATMENT SYSTEM TANK AND METHOD OF ASSEMBLY

(71) Applicant: HydroNovation, Inc., La Palma, CA (US)

(72) Inventors: Edward Smallhorn, Dartmouth (CA); Ramandeep Mehmi, Tracy, CA (US)

(73) Assignee: HydroNovation, Inc., La Palma, CA (US)

( * ) Notice: Subject to any disclaimer, the term of this patent is extended or adjusted under 35 U.S.C. 154(b) by 338 days.

(21) Appl. No.: 15/320,097

(22) PCT Filed: Jun. 19, 2015

(86) PCT No.: PCT/US2015/036660
§ 371 (c)(1),
(2) Date: Dec. 19, 2016

(87) PCT Pub. No.: WO2015/196056
PCT Pub. Date: Dec. 23, 2015

(65) Prior Publication Data
US 2017/0152152 A1 Jun. 1, 2017

Related U.S. Application Data

(60) Provisional application No. 62/014,869, filed on Jun. 20, 2014.

(51) Int. Cl.
| | |
|---|---|
| *C02F 1/00* | (2006.01) |
| *C02F 1/42* | (2006.01) |
| *C02F 1/44* | (2006.01) |
| *C02F 1/469* | (2006.01) |
| *C02F 1/28* | (2006.01) |

(Continued)

(52) U.S. Cl.
CPC ............. *C02F 1/006* (2013.01); *C02F 1/004* (2013.01); *C02F 1/283* (2013.01); *C02F 1/42* (2013.01); *C02F 1/441* (2013.01); *C02F 1/4691* (2013.01); *C02F 1/4693* (2013.01); *C02F 1/4695* (2013.01); *C02F 2101/10* (2013.01);
(Continued)

(58) Field of Classification Search
CPC .. C02F 1/006; C02F 1/283; C02F 1/42; C02F 1/4691; C02F 1/004; C02F 1/441; C02F 1/4693; C02F 1/4695; B01F 2215/0052
USPC ...................................................... 366/167.1
See application file for complete search history.

(56) References Cited

U.S. PATENT DOCUMENTS

| | | | |
|---|---|---|---|
| 2,048,606 A | 7/1936 | Fuetterer | |
| 2,241,621 A | 5/1941 | Mark Shoeld | |

(Continued)

FOREIGN PATENT DOCUMENTS

GB          477024 A    12/1937

OTHER PUBLICATIONS

International Search Report for International Application PCTUS1536660 dated Nov. 3, 2015.
(Continued)

*Primary Examiner* — Marc C Howell
(74) *Attorney, Agent, or Firm* — Lando & Anastasi, LLP

(57) ABSTRACT

According to various aspects and embodiments, a system and method for treating, storing, and delivering one or more liquids is provided. The systems and methods may utilize a water treatment assembly comprising a tank that includes an internal flow structure, a telescopic fitting, and a multi-port head fitting.

29 Claims, 18 Drawing Sheets

(51) Int. Cl.
*C02F 101/10* (2006.01)
*C02F 101/12* (2006.01)

(52) U.S. Cl.
CPC ...... *C02F 2101/12* (2013.01); *C02F 2209/05* (2013.01); *C02F 2303/04* (2013.01)

(56) References Cited

U.S. PATENT DOCUMENTS

| | | | |
|---|---|---|---|
| 3,443,697 A * | 5/1969 | Seggebruch | B01D 25/343 210/344 |
| 4,017,913 A | 4/1977 | Judd | |
| 4,285,602 A * | 8/1981 | Hagerty | B01F 5/242 366/101 |
| 4,301,009 A | 11/1981 | Cook et al. | |
| 4,340,308 A * | 7/1982 | Tharp | A01C 23/04 137/563 |
| 5,123,749 A * | 6/1992 | Avery, Jr. | B01F 5/242 366/341 |
| 6,663,766 B1 | 12/2003 | Adin et al. | |
| 8,110,103 B2 | 2/2012 | Mormino et al. | |
| 8,486,264 B2 | 7/2013 | Stolarik et al. | |
| 2008/0099394 A1 | 5/2008 | Falkner et al. | |
| 2010/0282689 A1 | 11/2010 | Ganzi et al. | |

OTHER PUBLICATIONS

Written Opinion of the International Searching Authority dated Nov. 3, 2015 for Application No. PCT/US2015/036660.

\* cited by examiner

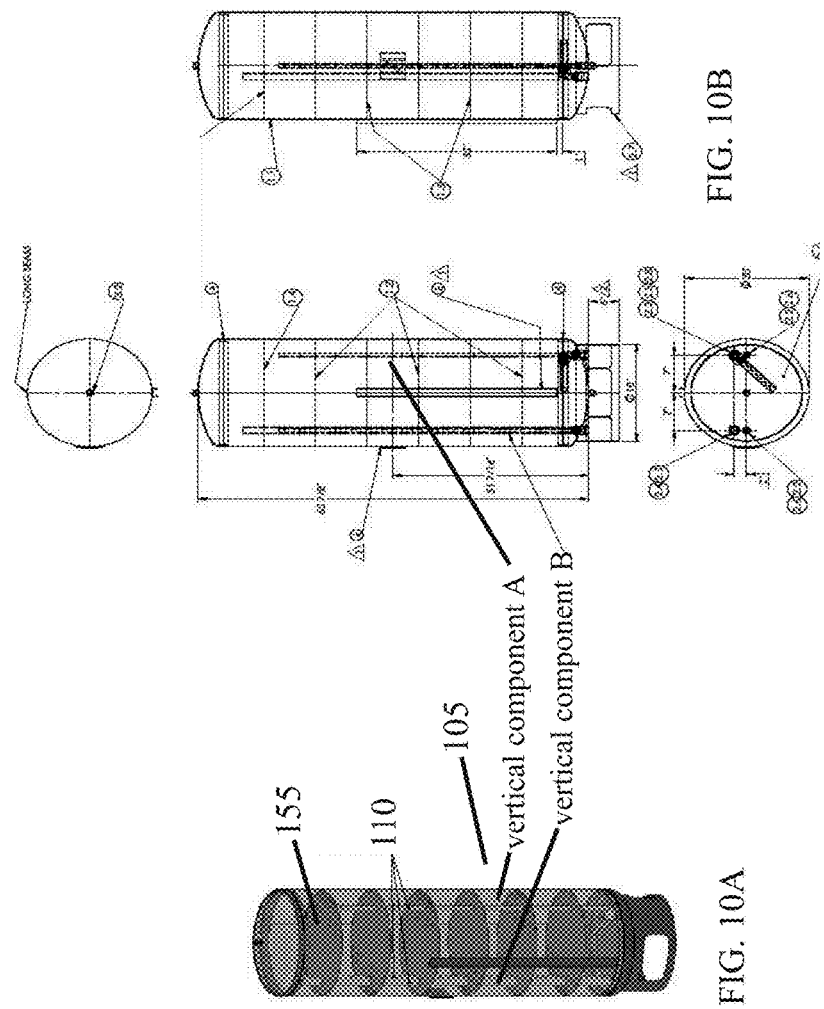

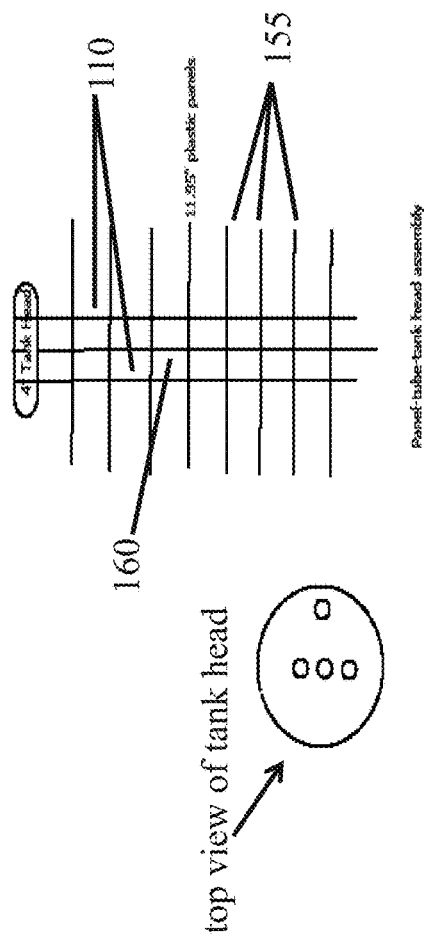
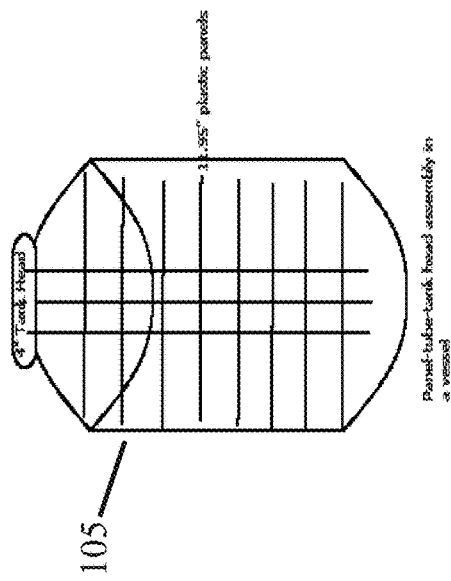
FIG. 11A
FIG. 11B

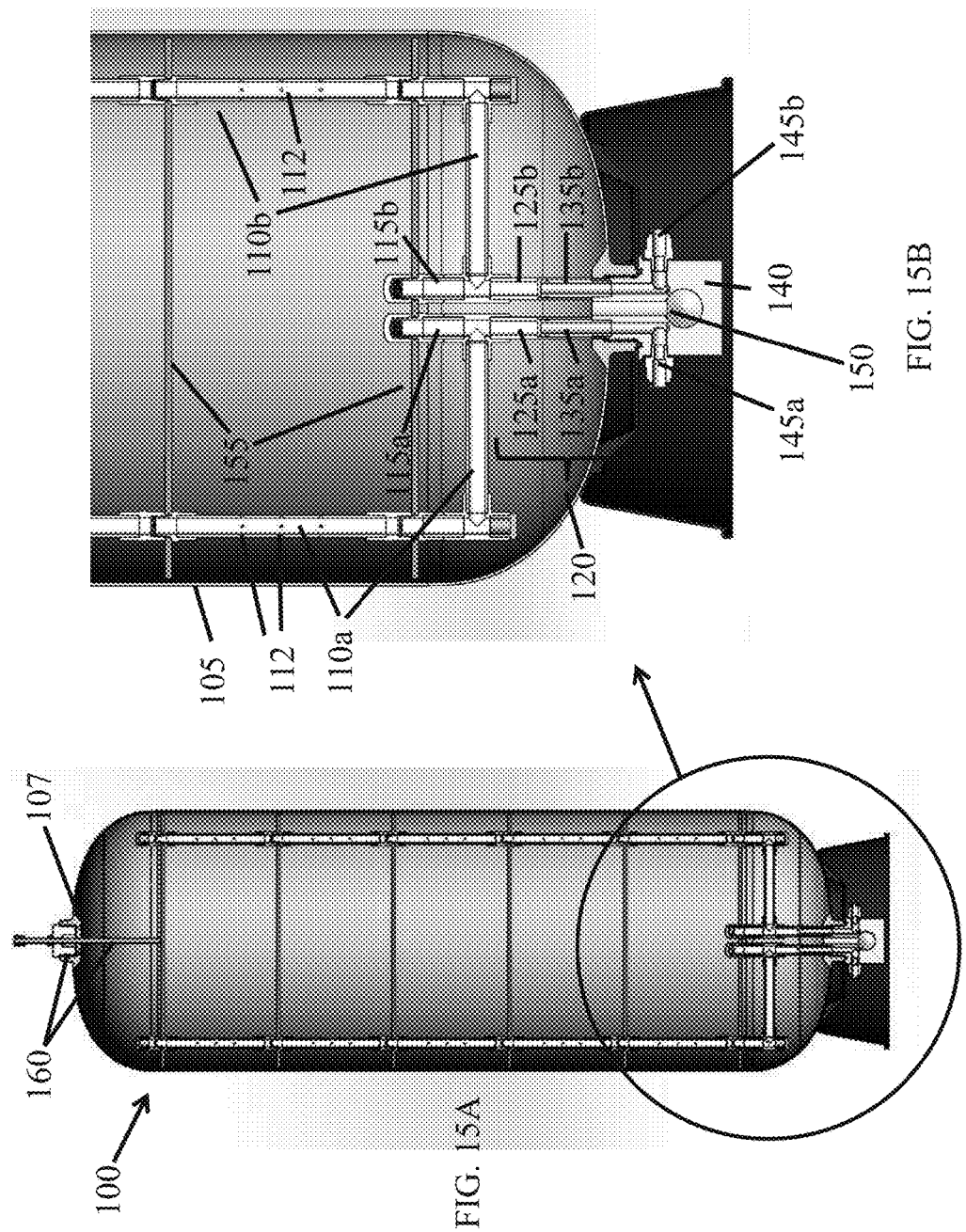

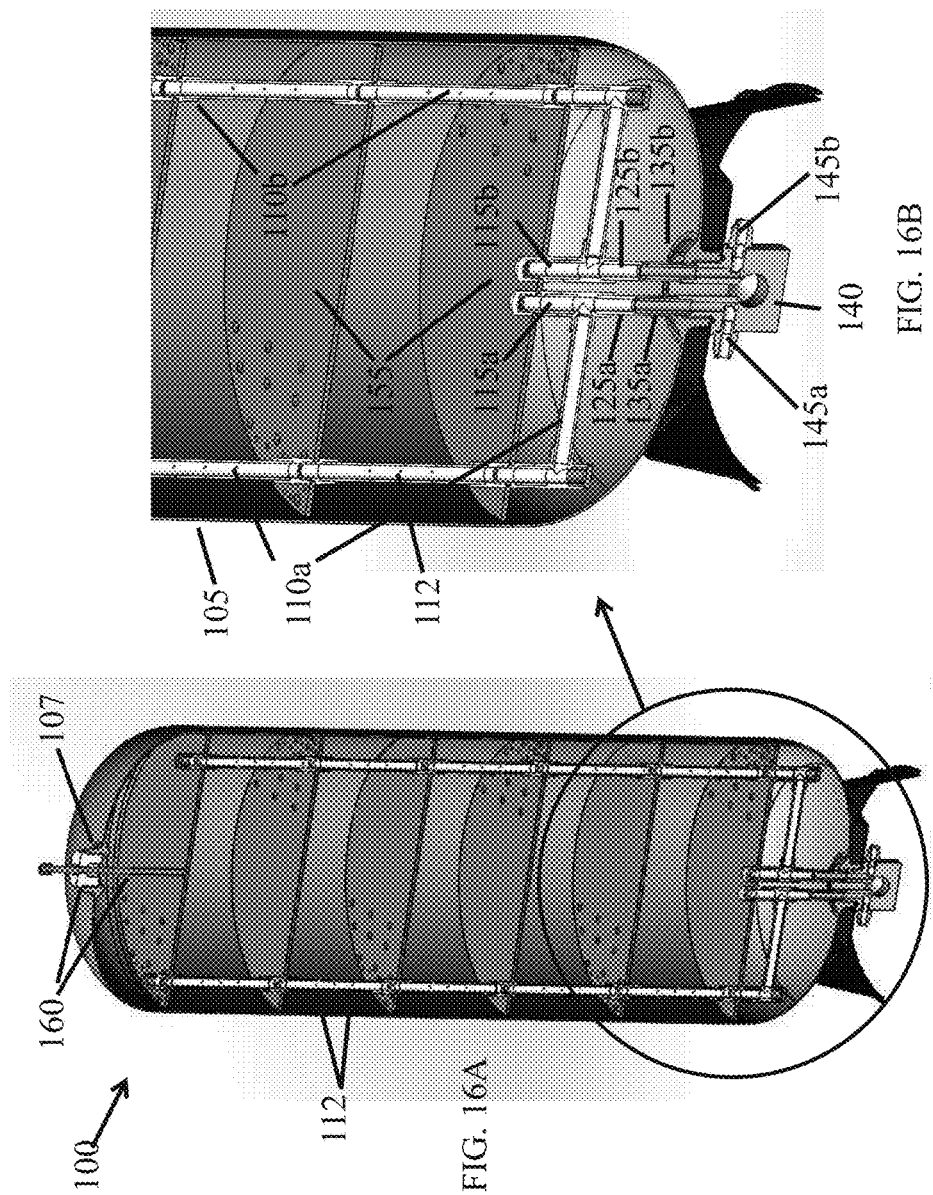

WATER TREATMENT SYSTEM TANK AND METHOD OF ASSEMBLY

CROSS-REFERENCE TO RELATED APPLICATIONS

This application is the U.S. National Phase Application under 35 U.S.C. § 371 of International (PCT)Patent Application Serial No. PCT/US 2015/036660, filed Jun. 19, 2015, which claims the benefit under 35 U.S.C. § 119 (e) and PCT Article 8 to U.S. Provisional Application Ser. No. 62/014,869 titled "WATER TREATMENT SYSTEM TANK AND METHOD OF ASSEMBLY," filed Jun. 20, 2014, the disclosers of which are hereby incorporated by reference in their entirety for all purposes.

BACKGROUND

Technical Field

Aspects relate generally to treating, storing, and delivering one or more liquids, and more particularly, to methods and systems for treating, storing, and delivering one or more liquids in a water treatment system assembly comprising a tank and a multi-port head fitting.

Background Discussion

Water that contains hardness species such as calcium and magnesium may be undesirable for some uses in industrial, commercial and household applications. The typical guidelines for a classification of water hardness are: zero to 60 milligrams per liter (mg/l) of calcium carbonate is classified as soft; 61 to 120 mg/l as moderately hard; 121 to 180 mg/l as hard; and more than 180 mg/l as very hard.

Hard water can be softened or treated by removing the hardness ion species. Examples of systems that remove such species include those that use ion exchange beds. In such systems, the hardness ions become ionically bound to oppositely charged ionic species that are mixed on the surface of the ion exchange resin. The ion exchange resin eventually becomes saturated with ionically bound hardness ion species and must be regenerated. Regeneration typically involves replacing the bound hardness species with more soluble ionic species, such as sodium chloride. The hardness species bound on the ion exchange resin are replaced by the sodium ions and the ion exchange resins are ready again for a subsequent water softening step.

Electrochemical technologies can be used to soften water. These technologies remove ionizable species from liquids using an electrical potential to influence ion transport. These devices may include electrically active media and/or electrically active membranes such as semi-permeable ion exchange or bipolar membranes.

SUMMARY

In accordance with one or more embodiments, a water treatment assembly is provided. The water treatment assembly includes a tank comprising an interior volume and an aperture positioned at a first end, a flow structure positioned within the interior volume of the tank, the flow structure including a plurality of first fluid passageways, a first riser pipe in fluid communication with the plurality of first fluid passageways, a plurality of second fluid passageways, and a second riser pipe in fluid communication with the plurality of second fluid passageways. The water treatment assembly also includes a first telescopic fitting comprising a first telescopic portion and a second telescopic portion, the first telescopic fitting in fluid communication with the first riser pipe, a second telescopic fitting comprising a first telescopic portion and a second telescopic portion, the second telescopic fitting in fluid communication with the second riser pipe, and a head fitting moveably mounted in the aperture, the head fitting including a first port in fluid communication with the first telescopic fitting, a second port in fluid communication with the second telescopic fitting, and a third port in fluid communication with a source of feed water and the interior volume of the tank.

According to one or more embodiments, the second telescopic portions of the first and the second telescopic fittings are configured to engage with the first riser pipe and the second riser pipe, respectively. According to a further embodiment, the second telescopic portions of the first and the second telescopic fittings comprises a connector tube. According to another embodiment, the first telescopic portion of the first telescopic fitting is configured to engage with the first port of the head fitting, and the first telescopic portion of the second telescopic fitting is configured to engage with the second port of the head fitting. According to a further embodiment, the first telescopic portions of the first and the second telescopic fittings comprises a pipe receptor. According to another embodiment, a portion of the head fitting is positioned exterior to the tank when the head fitting is mounted in the aperture and the first and the second telescopic fittings have engaged with the first and the second ports, respectively. According to some embodiments, the flow structure extends vertically along a length of the tank and is configured to rotate freely within the interior volume of the tank while the head fitting is mounted in the aperture. According to a further embodiment, the tank further comprises an outlet in fluid communication with the interior volume and positioned at a second end. According to some embodiments, the head fitting further comprises a first fluid passageway connected to the first port and a second fluid passageway connected to the second port, wherein the plurality of first fluid passageways of the flow structure, the first riser pipe, the first telescopic fitting and the first fluid passageway of the head fitting define a first fluid flow path, and the plurality of second fluid passageways of the flow structure, the second riser pipe, the second telescopic fitting, and the second fluid passageway of the head fitting define a second fluid flow path. According to a further embodiment, the first and the second fluid flow paths are in fluid communication with one or more depletion compartments of an electrochemical device. According to a further embodiment, the first fluid flow path is connected to an outlet of the one or more depletion compartments of the electrochemical device, and the second fluid flow path is connected to an inlet of the one or more depletion compartments of the electrochemical device.

According to at least one embodiment, the first port is in fluid communication with an outlet of one or more depletion compartments of an electrochemical device. According to a further embodiment, the second port is in fluid communication with an inlet of one or more depletion compartments of an electrochemical device.

According to some embodiments, the plurality of first fluid passageways is positioned on one side of the tank and the plurality of second fluid passageways is positioned on an opposite side of the tank. According to various embodiments, the telescopic fitting is configured to provide fluid communication between the flow structure and at least one fluid passageway positioned within the head fitting through the riser pipe.

According to another embodiment, at least one of the plurality of first fluid passageways and the plurality of second fluid passageways includes one or more hollow vertical components. According to a further embodiment, the one or more hollow vertical components comprise at least one perforation. According to a further embodiment, at least one of the plurality of first fluid passageways and the plurality of second fluid passageways includes a horizontal component in fluid communication with at least one of the first riser pipe and the second riser pipe. According to some embodiments, the horizontal component comprises at least one perforation.

According to another embodiment, the water treatment assembly further includes at least one of baffles, barriers, dispersers, and flow redistributors. According to at least one embodiment, the water treatment assembly further includes a plurality of baffles, wherein each baffle of the plurality of baffles is a horizontal tray comprising one or more perforations placed in one or more locations on the tray, the plurality of horizontal trays arranged in a vertical configuration. According to a further embodiment, each baffle is substantially circular in shape with the one or more perforations positioned at one side of the tray. According to some embodiments, a first baffle of the plurality of baffles has the one or more perforations positioned proximate one side of the tank, the first baffle positioned horizontally above a second baffle of the plurality of baffles, the second baffle having the one or more perforations positioned proximate the same side of the tank. According to a further embodiment, the one or more perforations of the second baffle are positioned proximate an opposite side of the tank. According to some embodiments, the at least one of the baffles, barriers, disperser, and flow redistributors is configured to prevent bacterial growth.

According to some embodiments, the water treatment assembly is configured to operate at a line pressure of a water treatment system associated with the water treatment assembly.

In accordance with one or more embodiments, a water treatment assembly is provided. The water treatment assembly includes a tank comprising an interior volume and an aperture positioned at a first end, a flow structure positioned within the interior volume of the tank, the flow structure comprising at least one fluid passageway, and a head fitting moveably mounted in the aperture, the head fitting including a first port in fluid communication with the flow structure, and a second port in fluid communication with a source of feed water and the interior volume of the tank.

According to one or more embodiments, the at least one fluid passageway includes a hollow vertical component. According to a further embodiment, the hollow vertical component comprises at least one perforation. According to another embodiment, the hollow vertical component is positioned substantially at the center of the tank. According to some embodiments, the water treatment assembly further includes a plurality of parallel baffles arranged in a vertical configuration in the tank. According to a further embodiment, each baffle is a horizontal tray comprises one or more perforations positioned on one side of the horizontal tray. According to some embodiments, a first baffle of the plurality of parallel baffles has the one or more perforations placed proximate one side of the tank, and the first baffle is positioned horizontally above a second baffle of the plurality of baffles, the second baffle having perforations positioned proximate an opposite side of the tank. According to various embodiments, the plurality of parallel baffles are arranged so as to provide a tortuous flow path. According to at least one embodiment, each baffle is configured to prevent bacterial growth. According to various embodiments, each baffle is sized to not come into contact with a side of the tank.

According to another embodiment, the flow structure is in fluid communication with at least one electrochemical device. According to some embodiments, the water treatment assembly is configured to operate at a line pressure of a water treatment system associated with the water treatment assembly.

In accordance with one or more embodiments, a head fitting is provided. The head fitting includes a housing, a first fluid passageway positioned within the housing, and a second fluid passageway positioned within the housing such that at least a portion of the second fluid passageway extends into the first fluid passageway.

According to another embodiment, the first fluid passageway includes an inlet and an outlet, wherein one of the inlet and the outlet is positioned proximate a first end of the housing. According to a further embodiment, the second fluid passageway includes an inlet and an outlet, wherein one of the inlet and the outlet of the second fluid passageway is positioned proximate the first end of the housing. According to another embodiment, at least a portion of the first end and a portion of a second end of the housing include an attachment mechanism. According to at least one embodiment, the attachment mechanism of the first end is attached to a tank. According to certain embodiment, the outlet of the first and the second fluid passageway is positioned proximate the first end of the housing. According to a further embodiment, the tank includes a flow structure positioned within an interior volume of the tank and the outlet of the second fluid passageway is configured to engage with the flow structure. According to a further embodiment, the inlet of the second fluid passageway is attached to a source of fluid such that the fluid is in fluid communication with the flow structure. According to a further embodiment, the attachment mechanism of the second end is attached to a source of feed water such that the feed water is in fluid communication with the inlet of the first fluid passageway. According to a further embodiment, the outlet of the first fluid passageway is in fluid communication with the interior volume of the tank. According to another embodiment, the heat fitting further includes a third fluid passageway positioned within the housing such that at least a portion of the third fluid passageway extends into the first fluid passageway, and the third fluid passageway includes an inlet and an outlet. According to certain embodiments, the inlet of the third fluid passageway is positioned proximate the first end of the housing and is configured to engage with the flow structure. According to at least one embodiment, the outlet of the third fluid passageway is in fluid communication with an electrochemical device. According to some embodiments, the inlet of the third fluid passageway is configured to be in fluid communication with a fluid exiting the flow structure. According to another embodiment, the outlet of the third fluid passageway is positioned proximate the first end of the housing and is configured to engage with the flow structure. According to a further embodiment, the inlet of the third fluid passageway is attached to the source of fluid. According to some embodiments, the source of fluid is a source of a first fluid, and the inlet of the third fluid passageway is attached to a source of a second fluid.

According to various embodiments, the other of the inlet and the outlet of the second fluid passageway is positioned on a side of the housing. According to another embodiment, the other of the inlet and the outlet of the first fluid passageway is positioned proximate a second end of the housing. According to some embodiments, the other of the inlet and the outlet of the first fluid passageway is positioned on a side of the housing. According to certain embodiments, a perimeter defining the first end of the housing is non-circular in shape.

According to at least one embodiment, the first fluid passageway extends from a first end to a second end of the housing. According to a further embodiment, the portion of the second fluid passageway is positioned substantially in the center of the first fluid passageway.

According to another embodiment, the heat fitting further includes a third fluid passageway positioned within the housing such that at least a portion of the third fluid passageway extends into the first fluid passageway. According to a further embodiment, each of the second and the third fluid passageways are positioned at equidistant locations from each other.

In accordance with one or more embodiments, a method for assembling a tank is provided. The method includes providing a tank comprising a flow structure and a first portion of a telescopic fitting, attaching a head fitting to a second portion of the telescopic fitting, and attaching the second portion of the telescopic fitting to the first portion of the telescopic fitting.

According to another embodiment, the method further includes attaching the head fitting to the tank. According to another embodiment, providing the tank includes providing the tank in at least two portions, and the method further includes attaching the flow structure to the first portion of the telescopic fitting, attaching the flow structure and the first portion of the telescopic fitting to at least one portion of the at least two portions of the tank, and attaching the at least two portions of the tank to each other.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

FIG. 10A is a diagram of a water treatment system assembly in accordance with another aspect of the disclosure;

FIG. 10B includes several diagrams of the water treatment system of FIG. 10A;

FIG. 11A is a diagram of a flow structure in accordance with one or more aspects of the disclosure;

FIG. 11B is a diagram of the flow structure of FIG. 11A positioned within a vessel in accordance with one or more aspects of the disclosure;

FIG. 15A is a diagram of a water treatment system assembly in accordance with another aspect of the disclosure;

FIG. 15B is a close-up view of a portion of the water treatment system of FIG. 15A;

FIG. 16A is a diagram of a water treatment system assembly in accordance with another aspect of the disclosure;

FIG. 16B is a close-up view of a portion of the water treatment system of FIG. 16A;

DETAILED DESCRIPTION

Figure 1:
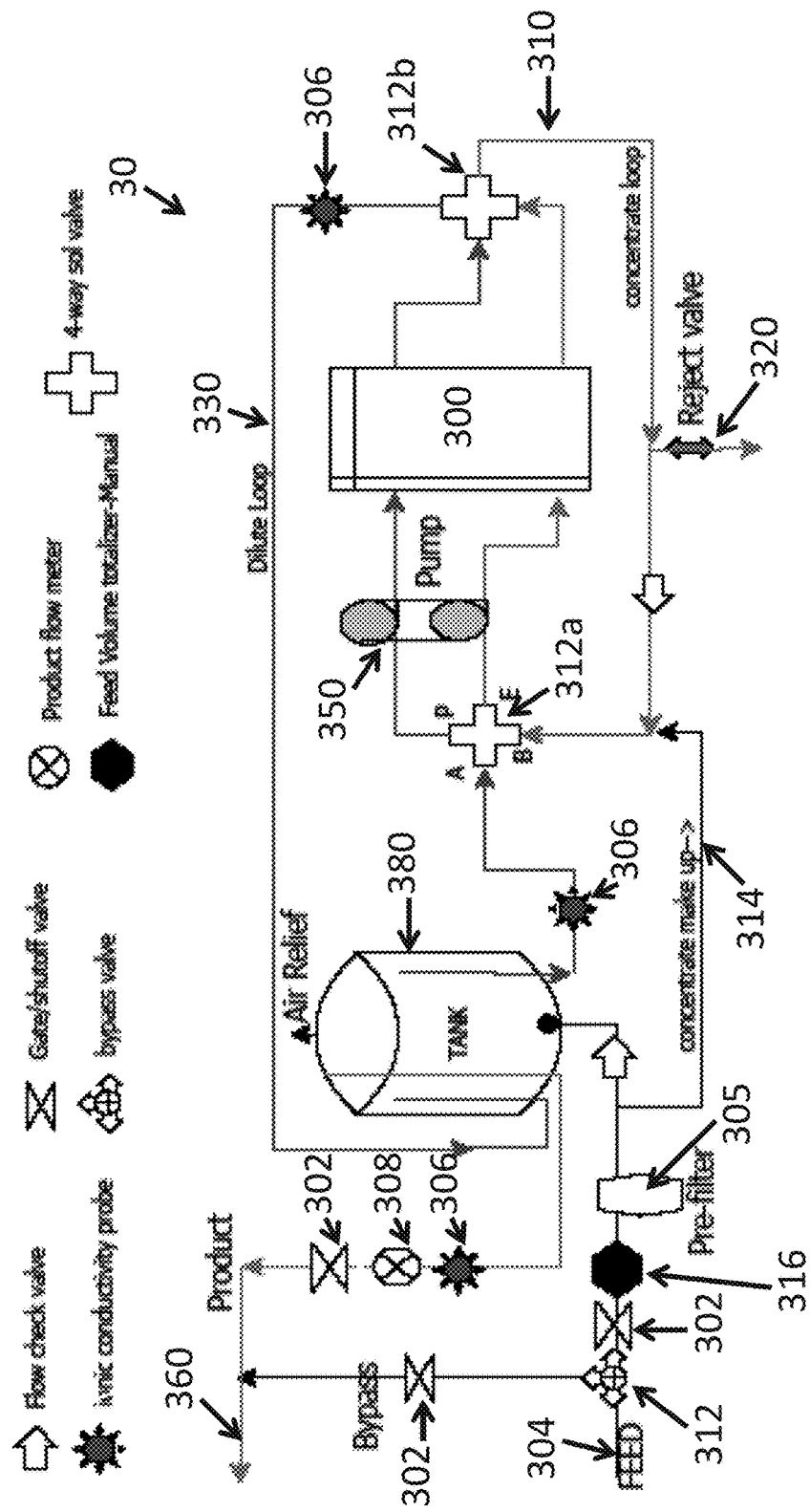
FIG. 1 is a process flow diagram of a water treatment system in accordance with one or more aspects of the disclosure.

By way of introduction, aspects of this disclosure relate to systems and methods for treating, storing, and delivering water using a water treatment assembly that includes a tank with a flow structure positioned within and a multi-port head fitting attached to the tank and in fluid communication with the flow structure through the use of a telescopic fitting. The assembly is configured to allow for the flow structure to rotate freely within the tank while the multi-port head fitting is being attached to the tank. Further, while the multi-port head fitting, also referred to herein as simply "head fitting" is being attached to the tank, the telescopic fitting is further attached and sealed to the flow structure. The systems disclosed herein allow for multiple streams of fluid to be introduced into the bottom of the tank, while allowing one stream to exit the top of the tank. According to certain aspects, the disclosed configurations may allow a longer residence time of one or more fluids in the tank, and may allow for minimal mixing between two or more fluids in the tank. Further, according to some embodiments, the water treatment assembly disclosed herein saves space over other systems, and is configured to provide treated water on demand.

The water treatment assembly disclosed herein allows for a manufacturer to build a tank with one or more internal structures already positioned within the tank. Once the tank is provided, standard tank thread connections may be used to fasten the internal structures to the head fitting disclosed and discussed further below. In the alternative, two tank halves may be formed first using any one of a variety of construction techniques, such as thermal forming or blow molding techniques. The internal structures may then be positioned within the two halves and then welded together. The internal structures may then be attached to the disclosed head fitting.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls. Moreover, titles or subtitles may be used in the specification for the convenience of a reader, which shall have no influence on the scope of the present invention.

Figure 2:
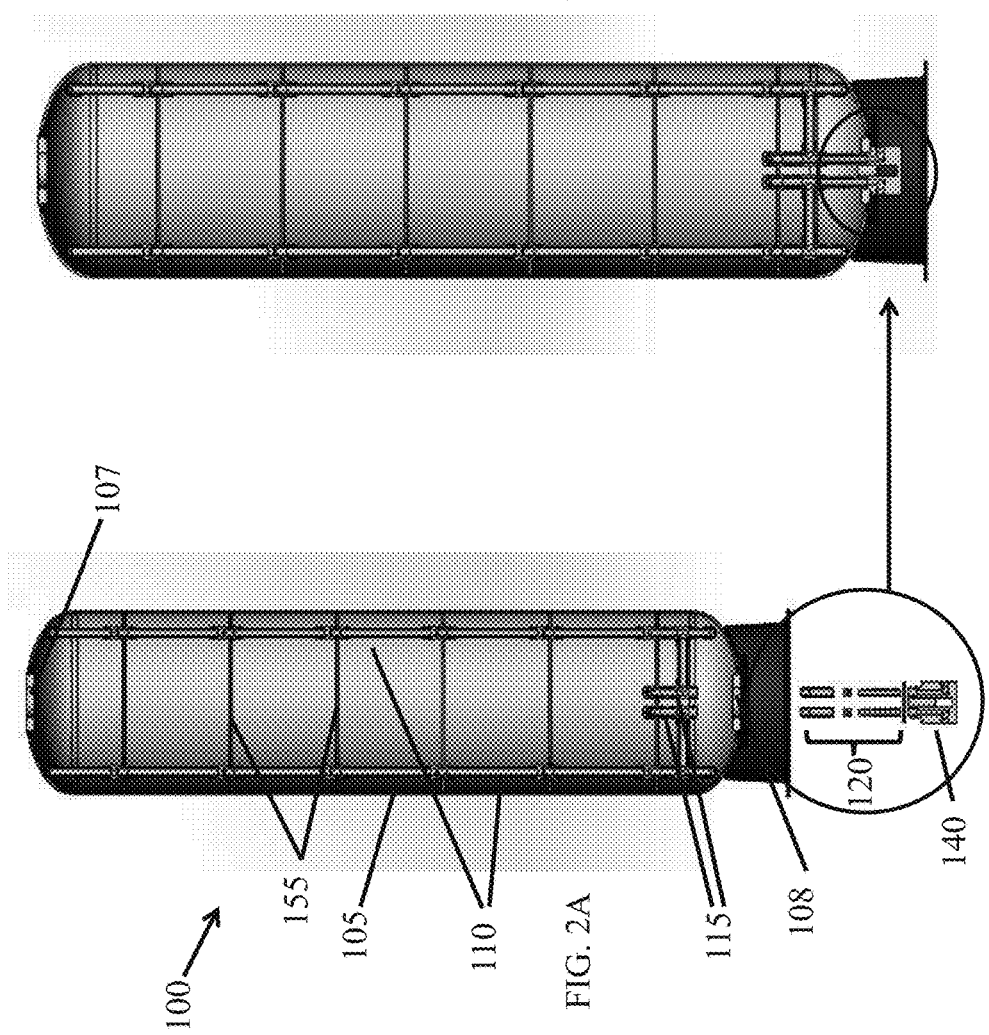
FIG. 2A is first diagram of a water treatment system assembly featuring an exploded view of a head fitting in accordance with one or more aspects of the disclosure.
FIG. 2B is a second diagram of the water treatment system assembly shown in FIG. 2A and featuring an assembled view of the head fitting in accordance with one or more aspects of the disclosure.

According to one or more embodiments, a water treatment assembly is disclosed that functions as a storage device and may be used in a treatment system such as the one discussed and described below in reference to FIG. 1. For example, FIGS. 2A and 2B illustrate a water treatment assembly 100 that includes a tank 105 with an upper aperture or top port 107, a lower aperture or bottom port 108, a flow structure 110, and a riser pipe 115. The water treatment assembly 100 also includes a telescopic fitting 120 and a head fitting 140 that are shown in an exploded unassembled view in FIG. 2A, and in an assembled view in FIG. 2B. As discussed in further detail below, the telescopic fitting 120 is configured to provide fluid communication between the internal flow structure 110 positioned within the tank 105 and one or more fluid passageways positioned within the head fitting 140 through the riser pipe 115.

According to one or more aspects, the water treatment assembly 100 is configured to function as a buffer volume of one or more fluids that are used in a water treatment system, such as the system discussed below in reference to FIG. 1. For example, the water treatment assembly 100 may be configured to allow for removal of a portion of processed water stored within the tank 105 through the top port 107 by minimizing the amount or level of mixing that occurs between the processed water and unprocessed or feed stream water flowing into the tank through the bottom port 108. According to at least one embodiment, the water treatment assembly 100 is configured to allow for the removal of approximately 65% of the processed water from within the tank without compromising the quality of the processed water by over-mixing with feed stream water entering the tank.

In accordance with some embodiments, the mixing between the processed and unprocessed fluids within the tank 105 may be minimized by providing a tortuous flow path within the tank 105. As used herein, the term "tortuous flow path" refers to any flow path having multiple changes of direction so as to inhibit flow of one or more fluids through the vessel. The tortuous flow path may be created by including structures or materials within the vessel, such as the flow structure 110 and baffles 155, discussed further below. For example, the tank 105 may include at least one of baffles, barriers, dispersers or flow redistributors, such as spaced horizontal perforated plates, grille bars, panels, screens, packing, or other suitable structures or materials.

According certain embodiment at least one of the baffles, barriers, dispersers or flow redistributors, and further, one or more of the components of the flow structure, may be configured to prevent bacterial growth, or may otherwise contribute to making the tank or vessel bacteria static. For example, one or more of these devices, such as a baffle, may be partially or entirely coated with a bacteriostatic agent that functions to slow or stop bacteria from reproducing, but does not necessarily kill the bacteria. The bacteriostatic agent may be a biological or chemical agent, non-limiting examples of which include bacteriostatic antibiotics, disinfectants, and antiseptics. According to another example, one or more of the devices, such as a baffle, may be constructed from a material that functions to prevent bacterial growth. For instance, silver may be used as part of the material construction. For example, the baffles may be constructed from a polymer that is doped or otherwise impregnated with silver. The polymer may contain silver in an amount of from 0.1 to 10 weight percent.

In accordance with at least one embodiment, the water treatment assembly 100 is configured to be operated at line pressure within a water treatment system. For example, the water treatment assembly 100 may be configured to operate at a line pressure of a water treatment system, such as the system described below in reference to FIG. 1 that is associated with the water treatment assembly 100. This may eliminate the need to re-pressurize the system before delivery to one or more users. According to various embodiments, the water treatment assembly 100 may be configured to operate at any line pressure associated with a desired application or system, including applications and systems with no line pressure, i.e., zero psi.

Figure 3:
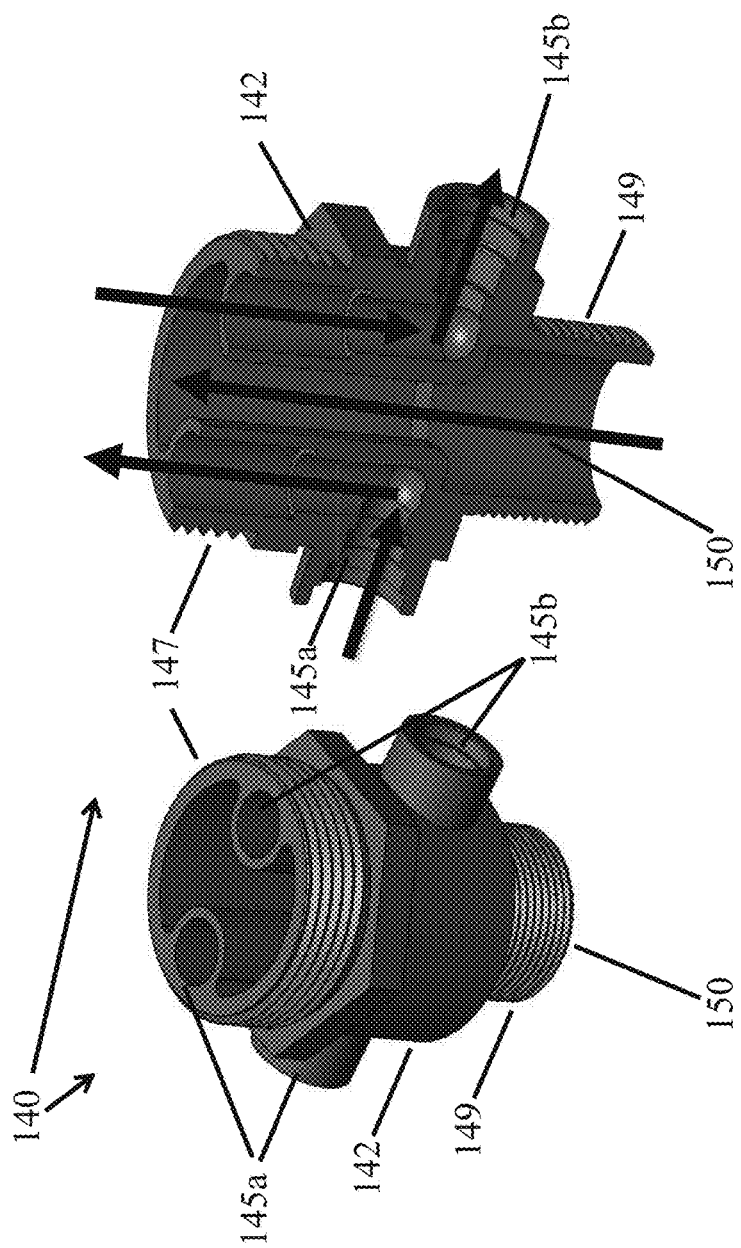
FIG. 3A is a diagram of a head fitting in accordance with another aspect of the disclosure.
FIG. 3B is a diagram of a cross-section of the head fitting of FIG. 3A.

FIGS. 3A and 3B show a head fitting 140 as mentioned above in reference to FIGS. 2A and 2B. FIG. 3A includes a perspective view of the head fitting 140 and FIG. 3B shows a cross-sectional perspective view of the head fitting 140 of FIG. 3A. As shown, the head fitting 140 includes a housing 142, at least one fluid passageway 145, indicated by fluid passageways 145a and 145b, and a feed passageway 150, which may also be characterized as a fluid passageway in the description herein. The cross-sectional view shown in FIG. 3B also includes arrows indicating one example of the flow path of fluids flowing through the head fitting 140, although other flow paths are within the scope of this disclosure, including the head fitting that is used with the system featured and discussed below in reference to FIGS. 12A and 12B. For example, fluid passageway 145a includes an inlet, indicated by the arrow coming into the fluid passageway 145a from the side of the head fitting 140, and an outlet, indicated by the arrow directed out of the fluid passageway 145a and positioned at the top of the head fitting 140. As used herein, the terms "inlet" and "outlet" may be used interchangeably with the term "port." Fluid passageway 145b also includes an inlet and an outlet, but with fluid flow in the opposite direction, as indicated by the arrows in FIG. 3B. For example, the inlet to fluid passageway 145b is located at the top of the head fitting 140 and the outlet is located at the side of head fitting 140. It will be understood that each of fluid passageways 145a and 145b may function to flow fluid into or out of one or more portions of the flow structure 110, either simultaneously, or separately. Each of the fluid passageways 145a and 145b are in fluid communication with a source of fluid, such as water. For example, the inlet of fluid passageway 145a may be in fluid communication with an outlet to one or more depletion compartments of an electrochemical device, such as the electrochemical device 300 discussed below in reference to FIG. 1. The outlet of fluid passageway 145a may be in fluid communication with one or more portions of the flow structure 110 positioned within the tank 105 through the telescopic fitting 120 and riser pipe 115, as shown in FIGS. 2A and 2B, and discussed further below. Further, the inlet of fluid passageway 145b may be in fluid communication with the internal volume of the tank 105 through the flow structure 110, through the telescopic fitting and riser pipe 115. The outlet of fluid passageway 145b may be in fluid communication with an inlet to one or more depleting compartments of an electrochemical device.

As shown in FIGS. 3A and 3B, the fluid passageways 145a and 145b are positioned within the housing 142 such that at least a portion of the fluid passageways 145a and 145b extend into the feed passageway 150. The diameter of each of fluid passageways 145a and 145b may be smaller than the diameter of the inlet for feed passageway 150. For example, according to one embodiment, the diameter of feed passageways 145a and 145b may be ½ inch, and the diameter of the inlet for feed passageway 150 may be 1¼ inches. Other dimensions are also within the scope of this disclosure. Further, the diameter of the outlet of the feed passageway 150 may be larger than the inlet of the feed passageway 150 to accommodate at least a portion of the fluid passageways 145a and 145b. Said another way, the shape of the perimeter defining one end of the feed passageway 150 (which in this particular embodiment corresponds to the outlet of the feed passageway), may be non-circular in shape. As will be understood, depending on the configuration of the fluid passageways, the shape of the perimeter defining the other end of the feed passageway 150 may also be non-circular in shape.

Figure 6:
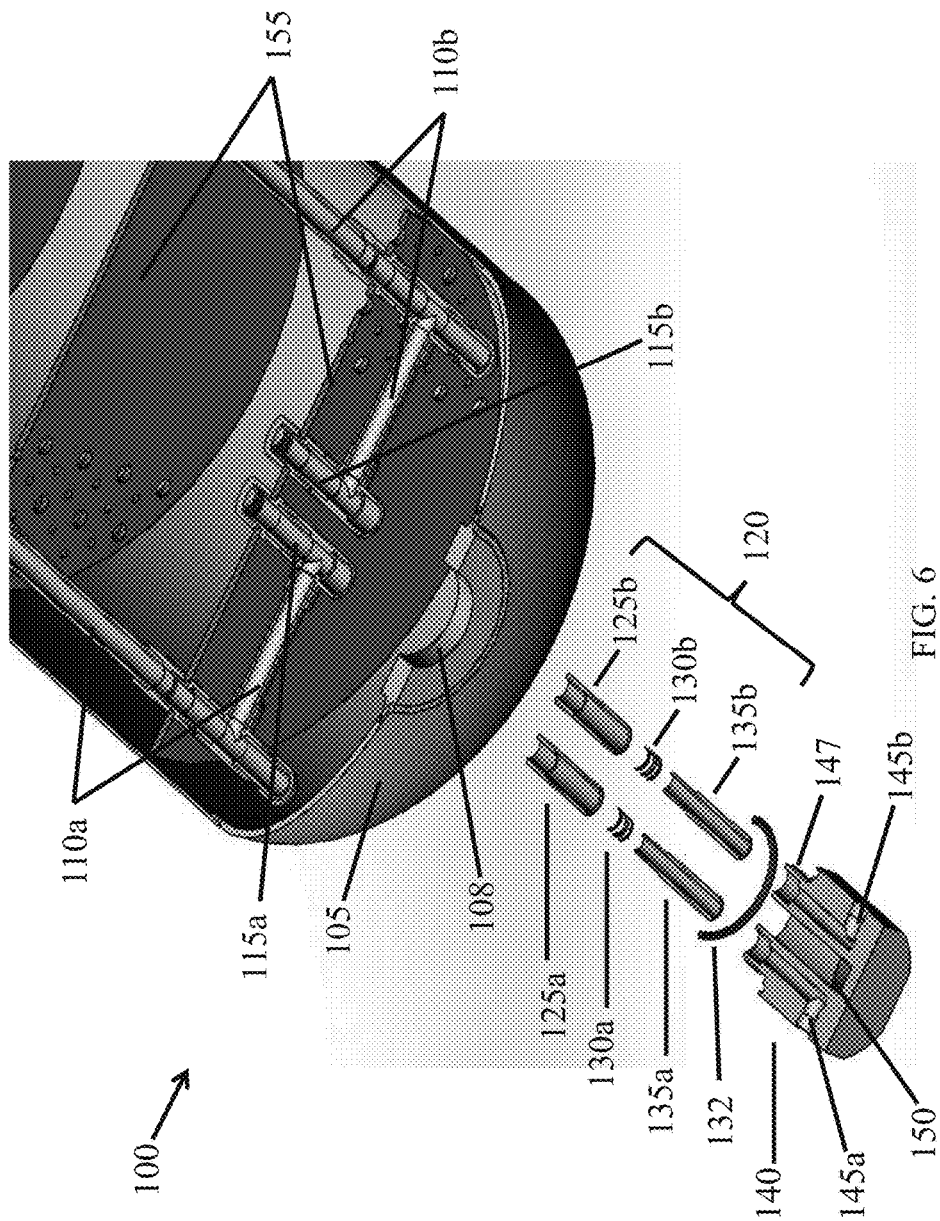
FIG. 6 is a diagram of a bottom portion of a water treatment assembly in accordance with one or more aspects of the disclosure.

Feed passageway 150 may be in fluid communication with a source of feed water, as discussed below, and may also include an inlet and an outlet, as indicated by the arrows in FIG. 3B. For example, feed water may enter the inlet to feed passageway 150 and move upward to exit into the internal volume of the tank 105. Thus, according to at least one embodiment, when the water treatment assembly 100 is fully assembled, the outlet of feed passageway 150 is in direct communication with the internal volume of the tank 105. For example, the top portion of head fitting 140 may also be configured to attach to the bottom of the tank 105, through the use of an attachment mechanism 147, such as threads. Other attachment mechanisms besides threads are within the scope of this disclosure, including mechanical and adhesive attachment methods. The bottom portion of head fitting 140 also includes an attachment mechanism 149 that is configured to attach to a source of feed, such as a pipe or manifold carrying feed water. Further, feed passageway 150 may be positioned on a side of the head fitting 140, as shown in FIG. 6, instead of at the bottom, as shown in FIG. 3B.

As will be appreciated by those of skill the art, other fluids besides water may be in communication with the fluid passageway(s) 145, and other sources of water may also be present in fluid passageway(s) 145 besides the specifically mentioned sources of water discussed above. For instance, one of the fluid passageways 145 may be in fluid communication with a source of disinfectant, such as chlorine, which may be used to disinfect at least a portion of the water contained within tank 105. For example, the water treatment assembly may be used in a chlorination process, where one or more features of the water treatment assembly, including the baffles 155, allow one or more fluids within the tank to have a higher residence time, which results in more uniform chlorination of the residing fluid(s) than systems that do not contain these features.

Further, although not shown in FIGS. 3A and 3B, the head fitting 140 may include more than two fluid passageways, and in fact, may include a single fluid passageway. For example, multiple fluid passageways may be positioned within the structure of the head fitting 140 in a similar manner as fluid passageways 145a and 145b. For instance, four fluid passageways 145 may be positioned within head fitting 140, with each fluid passageway positioned around the circumference of the head fitting at equidistant or non-equidistant locations from each other, with each fluid passageway in fluid communication with one or more sources of fluid, as discussed above. Likewise, three fluid passageways 145 may be positioned within head fitting 140, and in some instances, the third fluid passageway may provide a source of disinfectant. Any number of fluid passageways may be included in head fitting 140 for the purposes of performing water treatment functions as described in the methods and systems disclosed herein.

Figure 4:
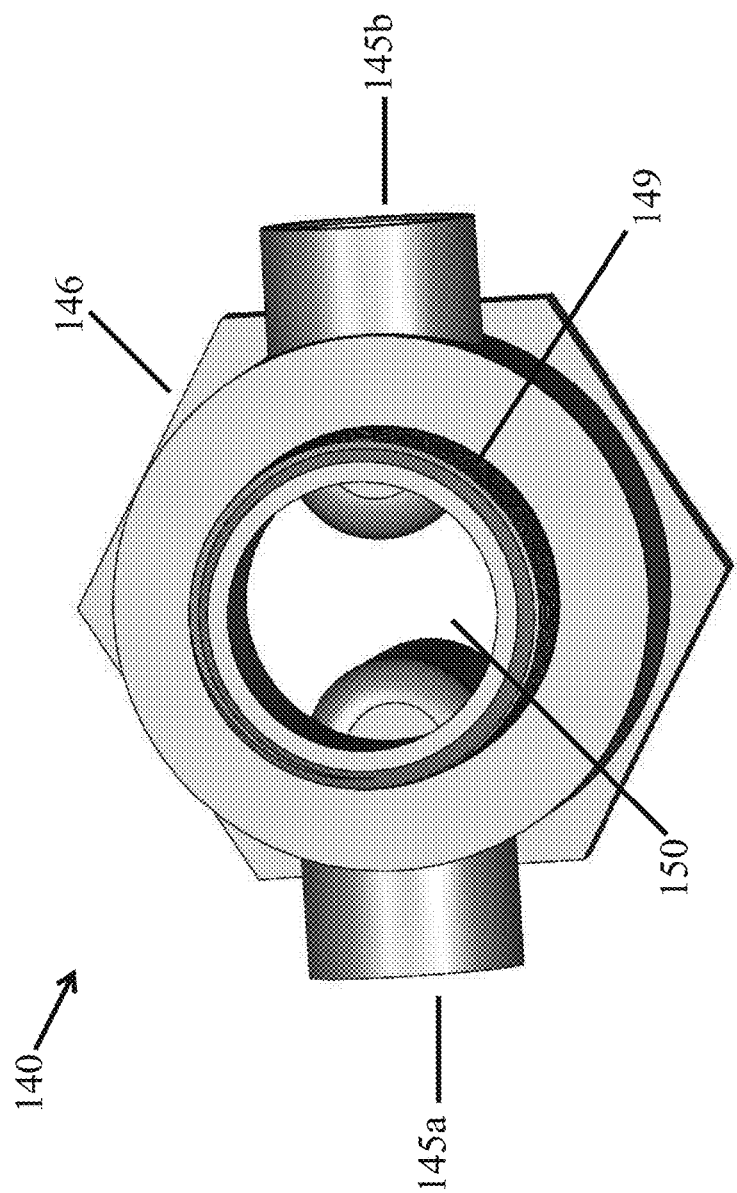
FIG. 4 is a bottom view of a head fitting in accordance with at least one aspect of the disclosure.

FIG. 4 is a bottom view of the head fitting 140 shown in FIGS. 3A and 3B, with the inlet to fluid passageway 145a positioned on one side of the head fitting 140 and the outlet to fluid passageway 145b positioned on the other side of the head fitting 140. The inlet to feed passageway 150 and the attachment mechanism 149 to a source of feed water are also shown in FIG. 4. The head fitting 140 also includes a hexagonal structure 146 positioned below attachment mechanism 149 that may be used, as discussed further below, when attaching the head fitting 140 to the tank 105.

Figure 5:
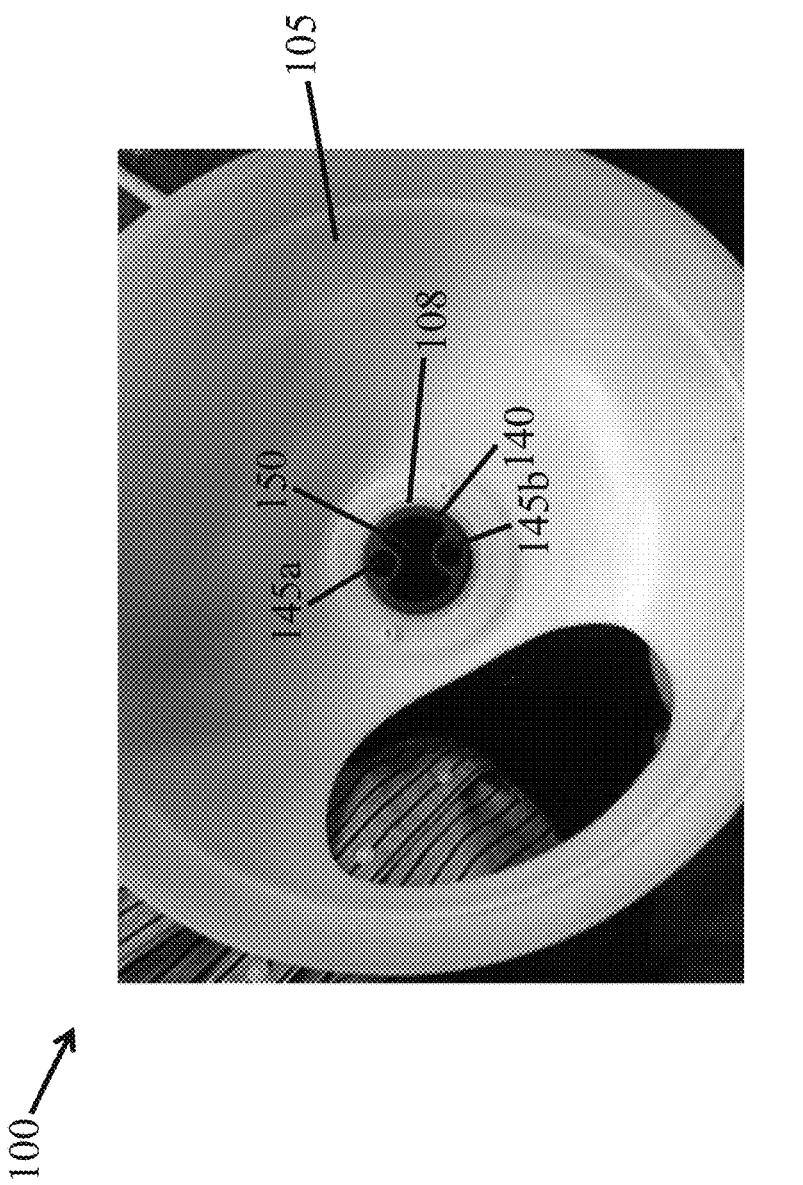
FIG. 5 is a diagram of a top view of a head fitting positioned onto the bottom of a tank in accordance with another aspect of the disclosure.

FIG. 5 is a top view of a head fitting 140 positioned onto the bottom of a tank 105. For example, threads of the attachment mechanism 147 of the head fitting 140 may mate with threads included in the lower aperture or bottom port 108 of the tank 105. As shown, fluid passageways 145a and 145b are positioned on opposite sides of the head fitting 140 and may be, as shown, positioned within at least a portion of the internal volume that comprises feed passageway 150. As discussed above, fluid passageways 145a and 145b may each be configured to attach to a riser pipe 115 through a telescopic fitting 120 that allows fluid transfer to one or more portions of the flow structure, as discussed further below. A portion of the tank 105 has been removed in FIG. 5, as evidenced by the hole on the left side.

FIG. 6 shows a bottom view of a water treatment assembly 100 that includes a cross-sectional view of a portion of the interior volume of the tank 105 and an exploded cross-sectional view of the telescopic fitting 120 and head fitting 140 components of the structure. As illustrated, tank 105 includes a lower aperture 108 and a fluid flow structure 110 that includes a first portion 110a positioned on one side of the tank 105 and a second portion 110b positioned on an opposite side of the tank 105. Also positioned within the tank 105 are a series of parallel baffles 155 spaced along the length or the vertical axis of tank 105. The baffles 155, as discussed further below, are attached to the vertical portions of the flow structure 110 and are substantially circular in shape, and therefore appear to have a half-moon shape in the cross-sectional view of FIG. 6. However, according to some embodiments, one or more of the baffles 155 may have a half-moon shape. Further, the baffles 155 may each include a plurality of openings or holes in one or more portions of the baffle 155 that are designed to allow water to pass through vertically in either an upward or downward direction. Each of the first and second portions 110a and 110b of the flow structure 110 may further be attached to first and second riser pipes 115a and 115b, respectively. The telescopic fitting 120 is comprised of a connector tube 125, a sealing device 130, and a pipe receptor 135. The connector tube 125 is configured to mate or otherwise connect with the riser pipe 115 positioned within the tank 105. A first end of pipe receptor 135 may be configured to fit within at least a portion of connector tube 125, and may therefore have a smaller outer diameter than an inner diameter of connector tube 125. One or more sealing devices 130, such as o-rings, may be configured to fit around at least a portion of the outer diameter of pipe receptor 135 and may therefore provide a friction-based mechanical attachment between the connector tube 125 and the pipe receptor 135. The sealing devices 130 may also function to provide a fluid seal so that fluid flowing through the telescopic fitting does not leak out. A second end of pipe receptor 135 may be configured to fit within at least a portion of the fluid flow passageway 145 of head fitting 140. Therefore, the second end of pipe receptor 135 may have an outer diameter that is smaller than the inner diameter of the fluid passageway 145.

As shown in FIG. 6, the flow structure 110, telescopic fitting 120, and fluid flow passageway 145 of head fitting 140 may be separated into separate fluid flow paths. For example, the inlet of fluid passageway 145a may be in fluid communication with one or more depletion compartments of an electrochemical device. This source of fluid may move upward through the outlet of fluid passageway 145a, and pass through one or more components of telescopic fitting 120, including pipe receptor 135a and connector tube 125a, before flowing into flow structure 110a through riser pipe 115a. As discussed further below, fluid positioned within flow structure 110a may then flow out into the internal volume of the tank 105. In a similar, but opposite flow pattern, fluid within the tank 105 may flow into flow structure 110b and move downward through riser pipe 115b and through one or more components of telescopic fitting 120, such as connector tube 125b and pipe receptor 135b, before exiting through the outlet of fluid passageway 145b.

The head fitting 140 shown in FIG. 6 includes an outlet to feed passageway 150 that is in fluid communication with the internal volume of the tank 105. Feed passageway 150 also includes an inlet positioned on a side portion of head fitting 140, and is therefore out of the plane of view shown in FIG. 6. As discussed above, the inlet of feed passageway 150 is in fluid communication with a feed stream.

The lower portion of water treatment assembly 100 may further include a sealing device 132, such as an o-ring, that functions to help seal the head fitting 140 to the tank 105. For example, a portion of the top of the head fitting 140 may include a circular recessed region that allows for the sealing device 132 to be positioned therein. When the head fitting 140 is attached to the tank 105, the sealing device 132 is positioned in between the bottom port 108 of the tank 105 and the top portion of the head fitting 140.

Figure 7:
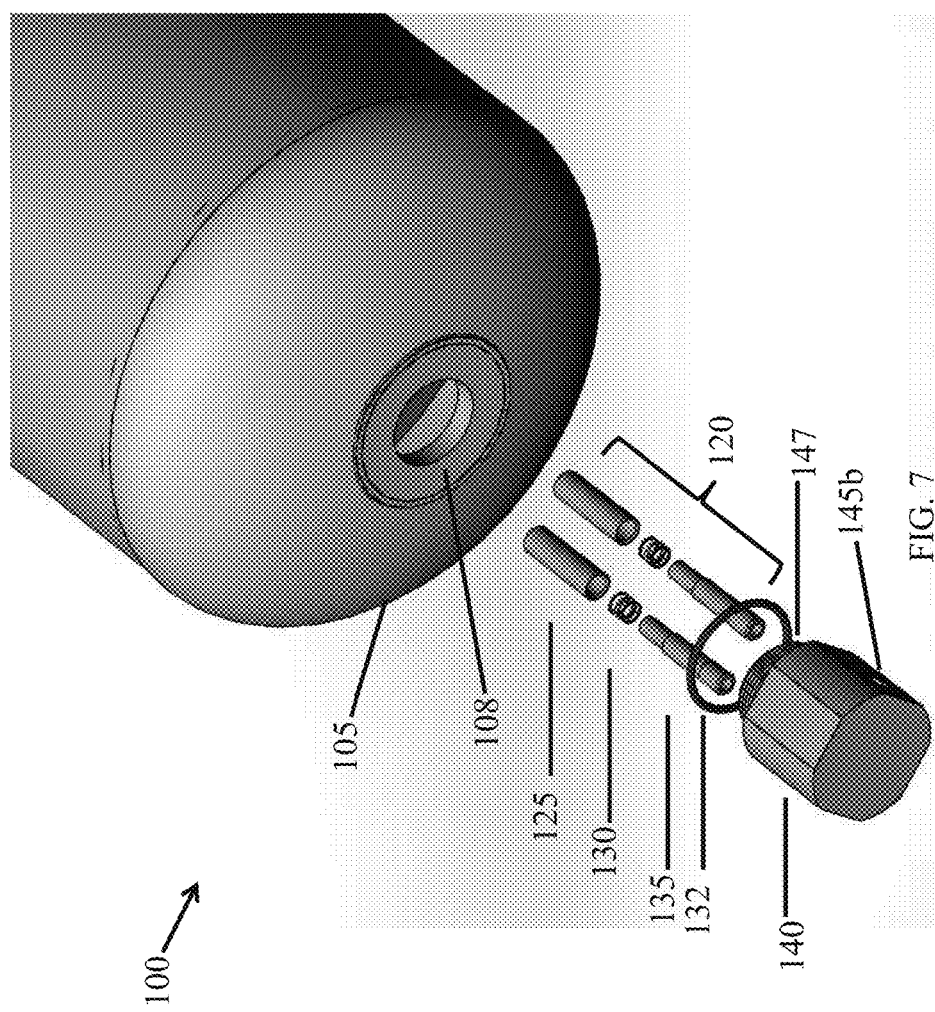
FIG. 7 is a diagram of a bottom portion of a water treatment assembly in accordance with one or more aspects of the disclosure.

FIG. 7 also shows a bottom view of the water treatment assembly 100 shown in FIG. 6, but without cross-sectional views of the tank 105, telescopic fitting 120, and head fitting 140. As shown, a first end of pipe receptors 135a and 135b is configured to fit within at least a portion of connector tubes 125a and 125b, respectively. Although not explicitly shown, a second end of pipe receptors 135a and 135b is configured to fit within at least a portion of fluid passageways 145a and 145b, respectively.

Figure 8:
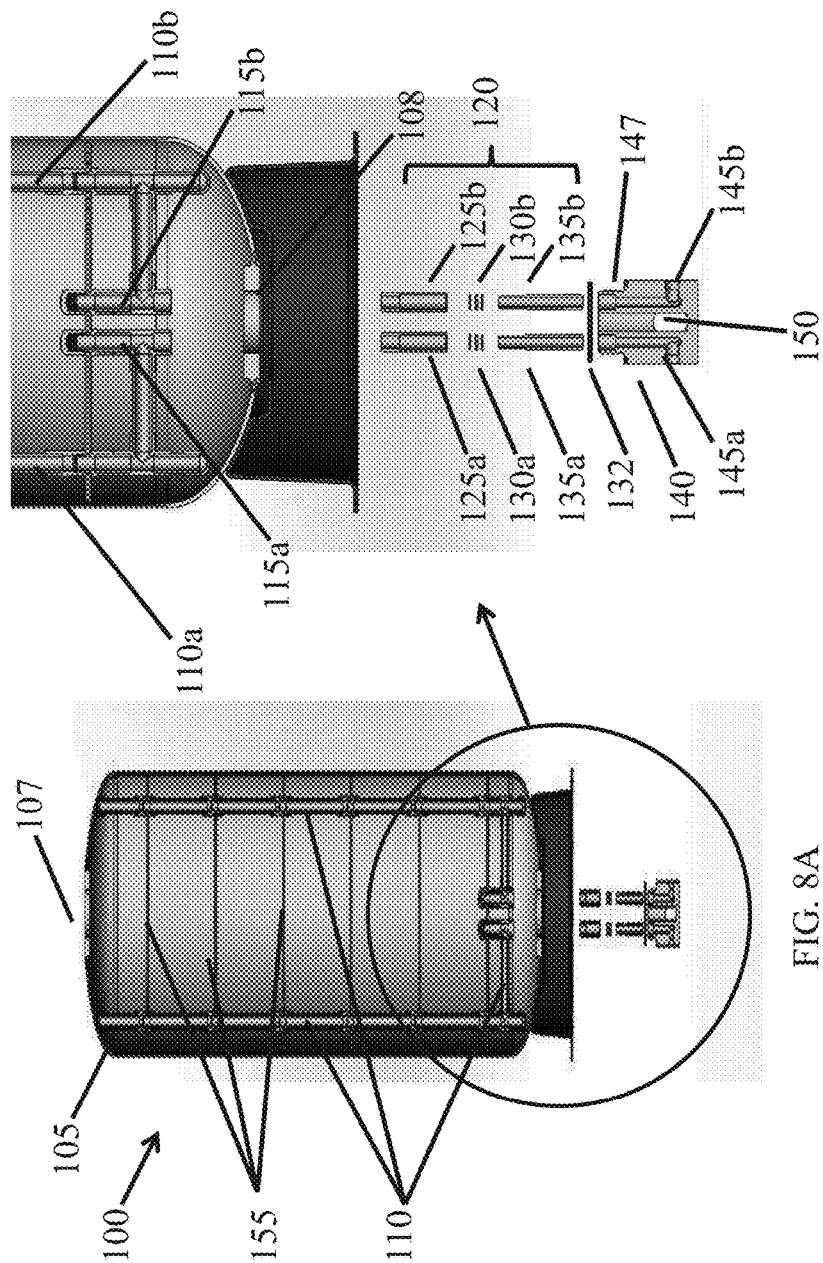
FIG. 8A is diagram of a water treatment system assembly in accordance with one or more aspects of the disclosure.
FIG. 8B is a close-up view of a portion of the water treatment system of FIG. 8A.

FIGS. 8A and 8B include side views of the water treatment assembly 100 discussed above in reference to FIGS. 6 and 7. Specifically, FIG. 8A illustrates a full side view of the tank 105, including the fluid structure(s) 110 and riser pipe(s) 115. FIG. 8B includes an enlargement of the circular section that encompasses the riser pipe(s) 115, telescopic fittings 120, including connector tube(s) 125, sealing device(s) 130, and pipe receptor(s) 135, sealing device 132, and head fitting 140 with the fluid passageway(s) 145 and feed passageway 150.

In accordance with one or more embodiments, a method for assembling the water treatment assembly 100 is disclosed. According to one embodiment, the method may include providing a tank 105 with one or more of the flow structure 110, baffles 155, riser pipe 115, and connector tube 125 already positioned within the interior volume of the tank 105. For example, the connector tubes 125a and 125b may be fastened to riser pipes 115a and 115b, respectively, before the flow structure 110 is positioned within the tank 105. Connector tubes 125a and 125b may therefore each have a top portion that is dimensioned or otherwise sized to fit within at least a portion of riser pipes 115a and 115b. The flow structure 110 may include the two vertical components of the flow structure 110, baffles 155, and the riser pipe 115 as discussed above in reference to FIG. 8, but other types of flow structures 110 and baffles 155 are also within the scope of this disclosure. For example, the flow structure 110 may include one or more features of the flow structures discussed below in reference to FIGS. 10A, 10B, 11A, 11B, 12A, and 12B. The riser pipe 115 is physically connected to the flow structure 110 and is configured to be positioned vertically over the lower port 108 of the tank 105. The flow structure 110 and baffles 155 are configured to be of a shape and size so that they may freely rotate within the tank 105, and, according to some embodiments, the vertical components extend the entire vertical length of the tank 105, while still allowing the flow structure 110 to freely rotate within the tank 105.

Once the tank 105 and its internal structures, including riser pipes 115a and 115b and connector tubes 125a and 125b are provided, the head fitting 140 may be attached to the other components of the telescopic fitting 120. For example, the bottom portion of pipe receptors 135a and 135b may be dimensioned to fit within and insert into the outlet of fluid passageway 145a and the inlet of fluid passageway 145b, respectively. Next, sealing devices 130a and 130b may be positioned onto the top portion of pipe receptors 135a and 135b, respectively. The sealing device 132 may also be positioned onto the head fitting 140 at this time, or may be positioned before inserting the pipe receptors 135 into the fluid passageways 145. Further, according to some embodiments, the head fitting 140 may be provided with pipe receptors 135a and 135b already attached.

At this point of the assembly process, the upper portion of the telescopic fitting 120 that includes the connector tubes 125a and 125b is attached to the riser pipe 115 and the lower portion of the telescopic fitting 120 that includes the pipe receptors 135a and 135b (with the attached sealing devices 130a and 130b) is attached to the head fitting 140. Each of pipe receptors 135a and 135b may then be aligned and pushed into connector tubes 125a and 125b, respectively, since the top portion of pipe receptors 135a and 135b are dimensioned to fit within connector tubes 125a and 125b. Thus, when the pipe receptors 135a and 135b are slid into the connector tubes 125a and 125b, the connector tubes 125a and 125b are attached to or otherwise in communication with the combination of the sealing devices 130a and 130b and the pipe receptors 135a and 135b, respectively. The vertical position of the telescopic fitting 120 in relation to the head fitting 140 is therefore configured to be adjusted through the "telescoping" capability of pipe receptors 135a and 135b within connector tubes 125a and 125b. The "telescoping" capability is further shown in FIG. 9, as discussed in more detail below.

Next, the attachment mechanism 147 is engaged for attaching the head fitting 140 into the lower port 108 of the tank 105. For example, if threads are used, then the threads of the attachment mechanism 147 of the head fitting 140 are lined up with threads in the bottom port 108 of the tank 105. Then the head fitting 140 is rotated to tighten the head fitting 140 to the tank 105. While the head fitting 140 is rotating, it also rotates the telescopic fitting 120 and flow structure 110 within the tank 105, since all of these structures are interconnected. This also causes the pipe receptors 135a and 135b to mate and seal with the connector tubes 125a and 125b. Therefore, according to at least one embodiment, the general assembly process includes first mating the bottom portion of the telescoping fitting 120 that includes the pipe receptor 135 to the head fitting 140, then aligning the pipe receptor 135 to the top portion of the telescopic fitting 120 that includes the connector tube 125 (and is already positioned within that tank 105 and attached to the riser pipe 115), and then attaching the head fitting 140 to the tank 105.

Figure 9:
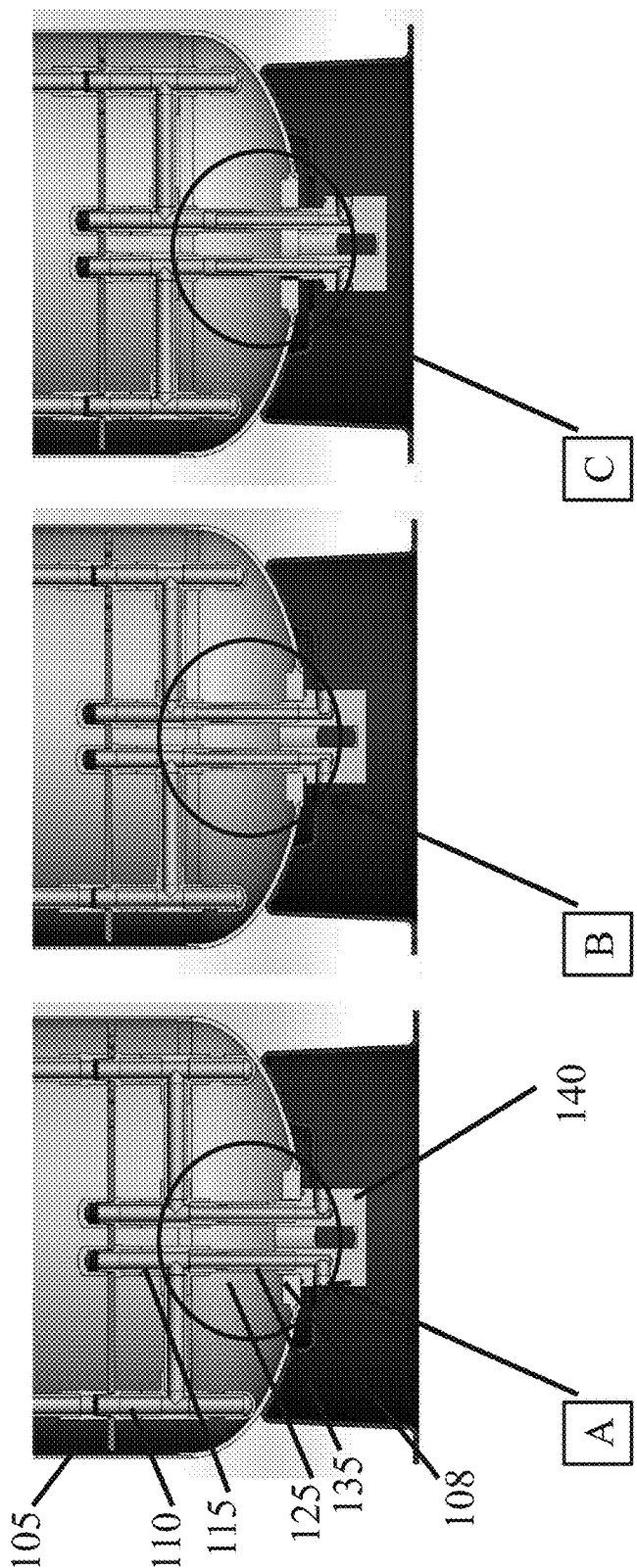
FIG. 9 is a series of diagrams illustrating different positions of a telescopic fitting in accordance with one or more aspects of the disclosure.

FIG. 9 illustrates a general sequence, labeled A, B, and C that indicates how the head fitting 140 and pipe receptors 135a and 135b fit into connector tubes 125a and 125b, respectively. In sequence A, the structures positioned within the tank 105, including flow structure 110, riser pipe 115, and the attached top portion of the telescopic assembly, including connector tube 125, are located at their lowest possible position within the tank 105, and the lower portion of the telescopic fitting, including the pipe receptor 135, is connected to the connector tube 125 and the other internal structures. Sequences B and C show the head fitting 140 being fully inserted into the bottom port 108 of the tank 105. For example, in Sequence B, the structures positioned within the tank are located at their highest possible position with the tank 105, and in Sequence C, the attachment mechanism 147 of the head fitting 140 are just making contact with the lower part of the bottom port 108 of tank 105. At the same time, the sealing devices (not shown) have begun to seal on the inside of the connector tubes 125a and 125b as the head fitting 140 is tightened into place. According to at least one embodiment, in all three sequences the telescopic fitting is functionally capable of conducting the flow of fluid, meaning the components are attached to each other in such a way as to allow an adequate seal and flow of fluid.

Although the method for assembling the water treatment assembly 100 discussed above uses a telescopic fitting 120 such as the structure illustrated in FIGS. 8A, 8B, and 9, other connection mechanisms are also within the scope of this disclosure. For example, the style, attachment method, and functionality of the components may each depend on a specific application. Other types of fittings that are capable of aligning and attaching internal structures positioned within the tank to flow devices attached onto or exterior to the tank are also within the scope of this disclosure.

According to another embodiment, the method may include providing a tank 105 in one or more sections. Therefore, the tank 105 does not contain or otherwise pre-provide the flow structure 110 and riser pipe 115 within a closed structure. For example, according to one embodiment, a tube structure is formed using a sheet of tank material, such as stainless steel, and then welded along the vertical seam. A top dome of the tank is then welded to the tube structure. The internal structures, such as the flow structure 110, baffles 155, and riser pipe 115, may then be attached to each other and then attached to a bottom dome of the tank. The internal structures attached to the bottom dome are then inserted into the tube structure and lastly, the bottom dome is welded to the tube structure.

In accordance with one or more embodiments, other methods for forming the tank may be provided. In one or more of these examples, the internal structures may be inserted into the tank before it is enclosed, for example, by sealing the bottom dome onto a tube structure. According to a first example, a flange tank may be provided, where a tube is pre-welded on one end of the dome and a van stone like flange is welded onto the other end of the dome. The flange may then be sealed using a sealing mechanism. In a second example, a double cup tank may be provided, where two domes are first welded together, with the tank outlet fittings, such as the head fitting discussed above, included onto the domes. The formed tank is then cut in half, and the internal structures are then installed within the two halves, which are then welded together and spun. A third example includes a bottom dome that is welded onto one or more internal structures, such as vertical components of a flow structure, and then other internal structures, such as baffles and/or riser pipes are positioned into place before the top dome is welded onto the bottom dome. A fourth example is provided by a tank and a separate assembly that includes internal structures configured into an umbrella-like formation. The internal structures may be attached to a tank head, which is then slid into the tank with the "umbrella" structure in a "closed" formation. Once inserted into the tank, the "umbrella" may be positioned into an "open" formation. A fifth example is provided by a drum tank that includes multiple hollow drum-like sections that are stacked on top of each other. Internal structures may then be installed within the stacked interior and top and bottom domes may then be welded and spun into place to form a tank. A sixth example is provided by having two halves of the tank be extruded, like a cup, and welded in the center after inserting the internal structures. In another alternative, the two halves may be formed using thermal formation methods. In yet another alternative, the two halves of the tank may be formed using blow molding techniques. The head fitting as described above may then be used to attach to the internal structures, as discussed above in reference to FIG. 8. In a similar example, the tank may be formed from individual sections, by any one or more of the methods discussed above, including extrusion, thermal, and blow molding techniques. The individual sections are then stacked together, the internal structures are positioned within the interior, and then the sections are wound with glass fiber.

In certain embodiments, and as discussed above, the methods and systems disclosed herein may include providing a tank. As used herein, the terms "tank" and "vessel" are used interchangeably and broadly mean any structure suitable for confining one or more process components, including gas, liquid and solid components and mixture thereof. The tank may be open to the environment, or may be closed, or may have one section that is open and another section that is closed. The tank may be closed to operate under pressure. The tank may be sized and shaped according to a desired application and volume of feed or product to be stored. For example, the tank may have an interior volume of 0.1 to 1000 gallons. In various embodiments, the tank may be constructed to be tall and thin to ensure optimal performance, for example, in a packed tank arrangement. The tank may be constructed of any material suitable for the purposes of the methods and systems described herein, such as for storing water. Non-limiting examples of suitable materials include steel, including stainless steel, fiberglass reinforced plastic, and polyvinyl chloride (PVC).

The tank may be constructed to include at least one port and the port(s) may be configured to receive or release gases or liquids. The ports may also be configured to be in communication with each other, or they may be configured to be in fluid isolation from each other. The ports may be positioned at the top of the vessel, the bottom of the tank, or anywhere in between that is suitable for accomplishing the methods described herein. In certain embodiments, one or more ports may be in fluid communication with at least one of a source of feed liquid, a treatment device, and a point of use.

Figure 18:
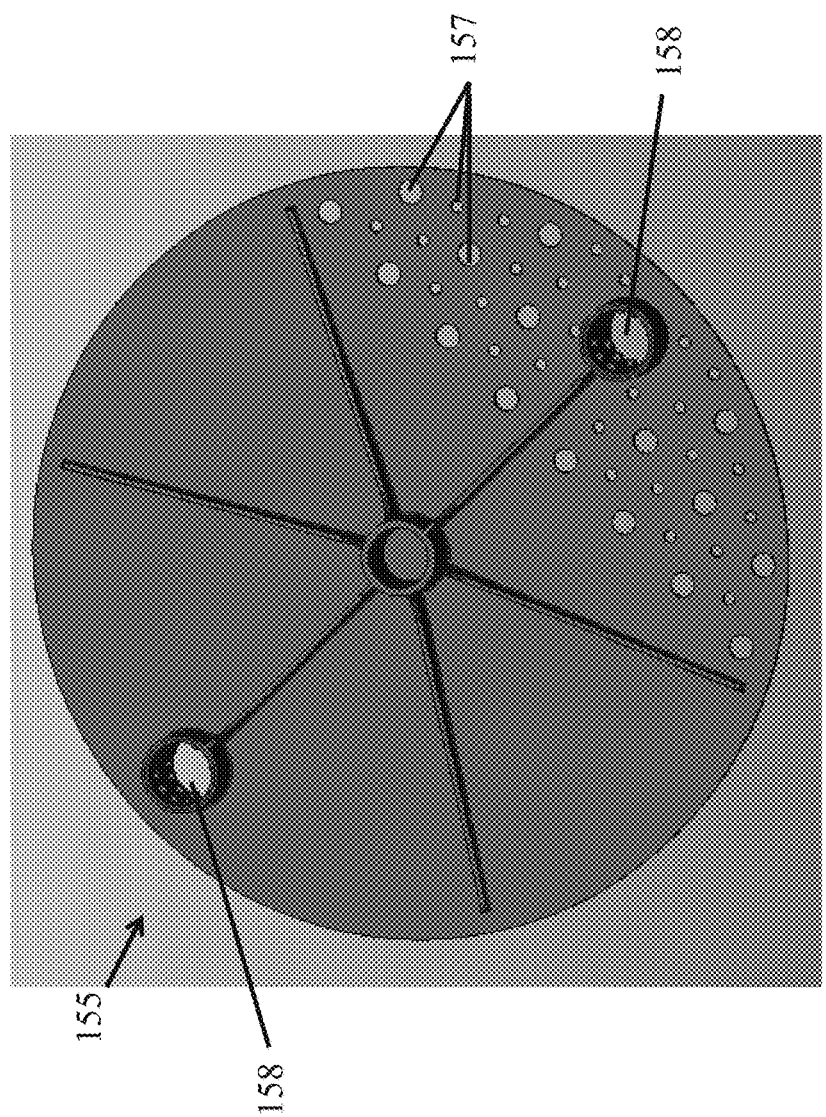
FIG. 18 is a diagram of a baffle in accordance with one or more aspects of the disclosure.

In accordance with certain embodiments, the tank comprises one or more baffles, such as the baffles 155 described above in reference to FIGS. 2A, 2B, 6, 8A, and 8B, and an example of which is also shown in FIG. 18. As used herein, the term "baffle" refers to a plate or partition that functions to impede the force or movement of one or more fluids. The baffles may be of any shape suitable for the purposes of providing a tortuous flow path as described in the methods and systems disclosed herein. In some embodiments, baffles may include either one or more individual curved elements. In other embodiments, the baffles may be perforated trays or panels. The baffles may be asymmetrically or symmetrically arranged in the tank and may be of different sizes or may be the same size. The baffles may be constructed from the same material as the tank, or constructed from one or more different materials.

In one or more embodiments, the baffles may be panels that include one or more perforations or holes positioned in one or more portions of the panels. According to some embodiments, the panels may have a substantially circular shape, or semi-circular (half-moon) shape. The perforations may be placed in one or more locations on the panel and may be of one or more shapes and sizes, such as circular holes of different diameters. In other instances, one or more of the perforations may be of the same size and shape. According to some embodiments, the holes may be placed on one side of the panel, near the edge or side of the tank. The panels may be arranged in the tank so that a panel with holes on one side of the panel is horizontally positioned above a panel with holes at the other end of the panel. Thus, when a plurality of these panels are arranged vertically in a tank, the effect is to provide a tortuous flow path through the vessel.

Referring to FIG. 18, an example of a baffle 155 in accordance with one or more aspects of this disclosure is shown. For example, the baffle 155 shown in FIG. 18 may be used in one or more of the water treatment assemblies discussed herein, including FIGS. 17A and 17B. As shown in FIG. 18, the baffle 155 is circular in shape and includes one or more perforations 157 that comprise individual circular holes of different sizes. According to this embodiment, the baffle 155 also includes one or more openings 158 to accommodate elements or portions of the flow structure 110, such as the vertical components shown in FIGS. 2A and 2B. In certain instances the baffle 155 may mechanically attach to the flow structure 110. Although not explicitly shown in FIG. 18, the center of the baffle 155 may also be configured as an opening to accommodate either a portion of the flow structure 110, or a support structure, such as a rod.

As discussed above, according to some embodiments, the baffles may be one or more perforated trays. The perforated trays may have a substantially rectangular shape, or have a substantially circular shape, and, depending on the configuration, define either a serpentine or spiral flow path throughout the vessel. The perforations may be placed in one or more locations on the tray. For example, the perforations may be placed at either end of a rectangular tray. The trays may then be arranged in the vessel so that a tray with perforations on one end of the tray is placed horizontally above (or below) a tray with perforations at the other end of the tray. When a plurality of these trays are arranged in a vertical fashion in a vessel, the effect is to provide a tortuous flow path through the vessel. In the alternative, the trays may be arranged in the vessel so that a tray with perforations on one end of the tray is placed horizontally above (or below) a tray with perforations on the same side of the tray.

FIGS. 10A and 10B show a water treatment system tank 105 that includes a flow structure 110 and a series of parallel baffles 155 positioned along the vertical length within the interior of tank 105. As illustrated in FIGS. 10A and 10B, the flow structure 110 includes one or more hollow vertical components that extend along at least a portion of the length of tank 105. For example, vertical component A may be in fluid communication with the outlet of one or more depletion compartments of an electrochemical device, and vertical component B may be in fluid communication with the inlet of one or more depletion compartments of the electrochemical device. The flow structure 110 may also include one or more horizontal components, such as the horizontal components located at the bottom of the tank 105 shown in FIGS. 10A and 10B. The horizontal component may function as an inlet to the interior volume of the tank 105 and may further include perforations or holes, as discussed further below. The flow structure 110 is designed to distribute and deliver one or more fluids, such as water, throughout the tank.

According to some embodiments, at least one of the flow structure 110 and the baffles 155 is configured to provide a tortuous flow path for one or more fluids within the tank 105. The tortuous flow path provided in the vessel may function to minimize mixing between one or more fluids within the tank. For fluids entering the bottom of the tank, the tortuous flow path has the effect of horizontally extending the flow path through the tank while preventing backmixing and crossmixing of the one or more fluids contained within the tank.

According to at least one embodiment, FIG. 11A shows an example of a flow structure 110 that includes two vertical components and a series of parallel baffles 155 extending along the length of the vertical components. The assembly also includes a support structure 160 in the form of a central vertical pipe, although in some embodiments, this central structure may be an additional conduit included in the flow structure 110 and may therefore be used for fluid transport. According to a further embodiment, the support structure 160 may also be used during tank assembly or maintenance for the purposes of sending in or removing tank contents, besides providing structural support, as discussed below.

The flow structure 110, baffles 155, and support structure 160 may be constructed from any one of a number of different materials, including polymer materials that are considered compatible with drinking water. According to some embodiments, the flow structure 110 may be constructed from the same types of materials that the baffles may be constructed from, as discussed above. FIG. 11A also shows a top view of a tank head that includes four openings for accommodating one or more of the vertical components of the flow structure 110. FIG. 11B shows the flow structure 110 and baffles 155 of FIG. 11A positioned within a tank 105. As shown, the vertical components of the flow structure 110 extend substantially along the length of the tank 105, and the horizontal series of parallel baffles 155 extend substantially across the width of the tank 105. As discussed above, the flow structure 110 and baffles 155 are dimensioned or otherwise configured to be able to rotate freely within the tank 105. Therefore, the baffles 155 are attached to the vertical components of the flow structure 110 and are sized to not come into contact with the interior sides of the tank 105.

Figures 12A, 12B:
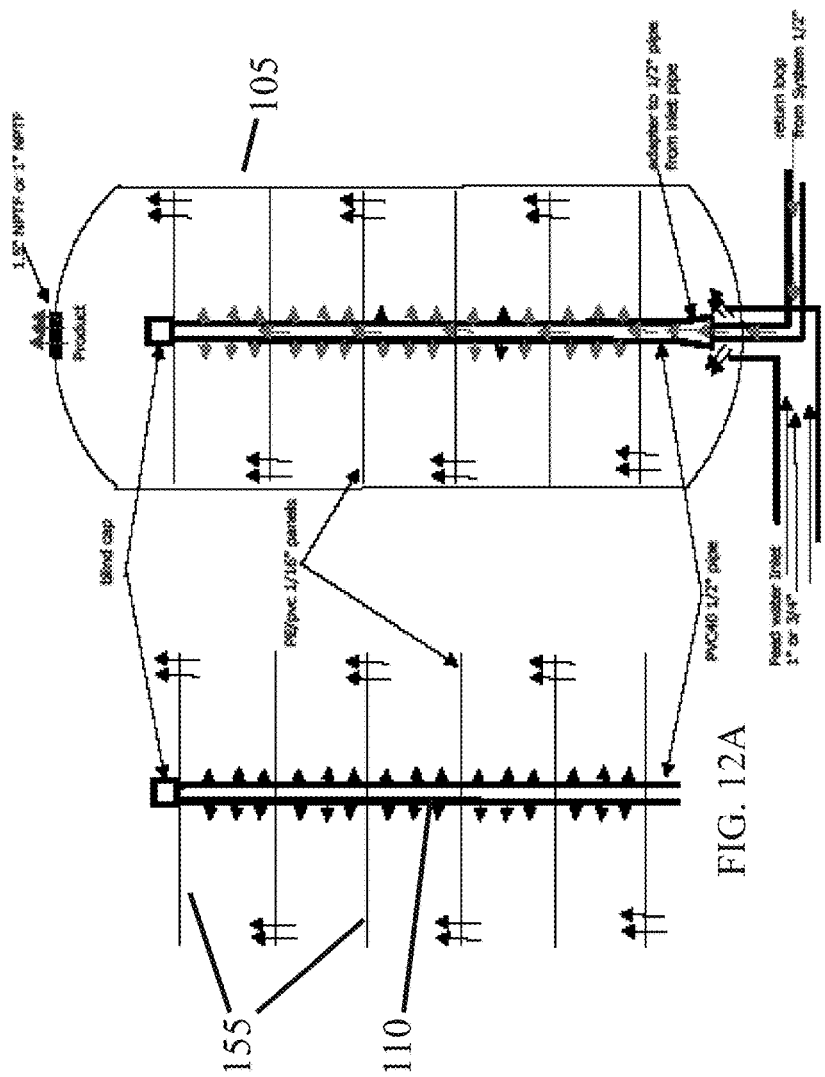
FIG. 12A is a fluid flow diagram shown in combination with a flow structure in accordance with one or more aspects of the disclosure.
FIG. 12B is a diagram of the flow structure of FIG. 12A positioned within a vessel in accordance with one or more aspects of the disclosure.

FIGS. 12A and 12B show another example of a flow structure 110 and baffles 155 in accordance with another embodiment. FIG. 12A includes a flow structure 110 that includes a single vertical component and a series of parallel baffles 155 that extend along the length of the vertical component. FIG. 12B shows the incorporation of the flow structure 110 and baffles 155 within a tank 105. The vertical component of the flow structure 110 is positioned within the interior volume, but in contrast to the flow structures of, for example, FIGS. 2A and 2B, the flow structure 110 of this embodiment is positioned substantially at the center of the tank 105. According to various aspects, the flow structure 110 may be in fluid communication with an electrochemical device, such as the outlet of a depletion compartment of an electrochemical device. According to at least one embodiment, fluid from the electrochemical device, such as from an outlet of one or more depletion compartments, may flow upward through the flow structure 110 and move outward into the interior volume of the tank 105 through perforations or holes positioned within the vertical component of the flow structure 110, as discussed below.

The bottom of the tank 105 shown in FIG. 12B includes a feed inlet where a feed stream enters the tank 105 and moves upward and out toward the edges of the tank. The flow of the feed liquid is at least partially controlled by the baffles 155. For example, the center of the baffles 155 may not contain any holes or perforations, whereas one or more sides or edges of the baffles may contain holes or other structures that allow for the passage of fluid. This may allow the feed liquid to effectively travel up along the sides of the tank but also provide for minimal mixing with the processed feed water from the electrochemical device that is coming out through the central vertical component of the flow structure 110. Further, according to some embodiments, the tank 105 may be fitted with a head fitting 140, as discussed above, with a single fluid passageway 145 to accommodate the processed water and a feed passageway 150 to accommodate the feed stream. According to this embodiment, the fluid passageway 145 the portion of the fluid passageway that extends into the feed passageway 150 is positioned substantially in the center of the feed passageway. According to a further embodiment, the tank 105 may also be fitted with a telescopic fitting 120 as described above to use with the head fitting 140.

Figure 13:
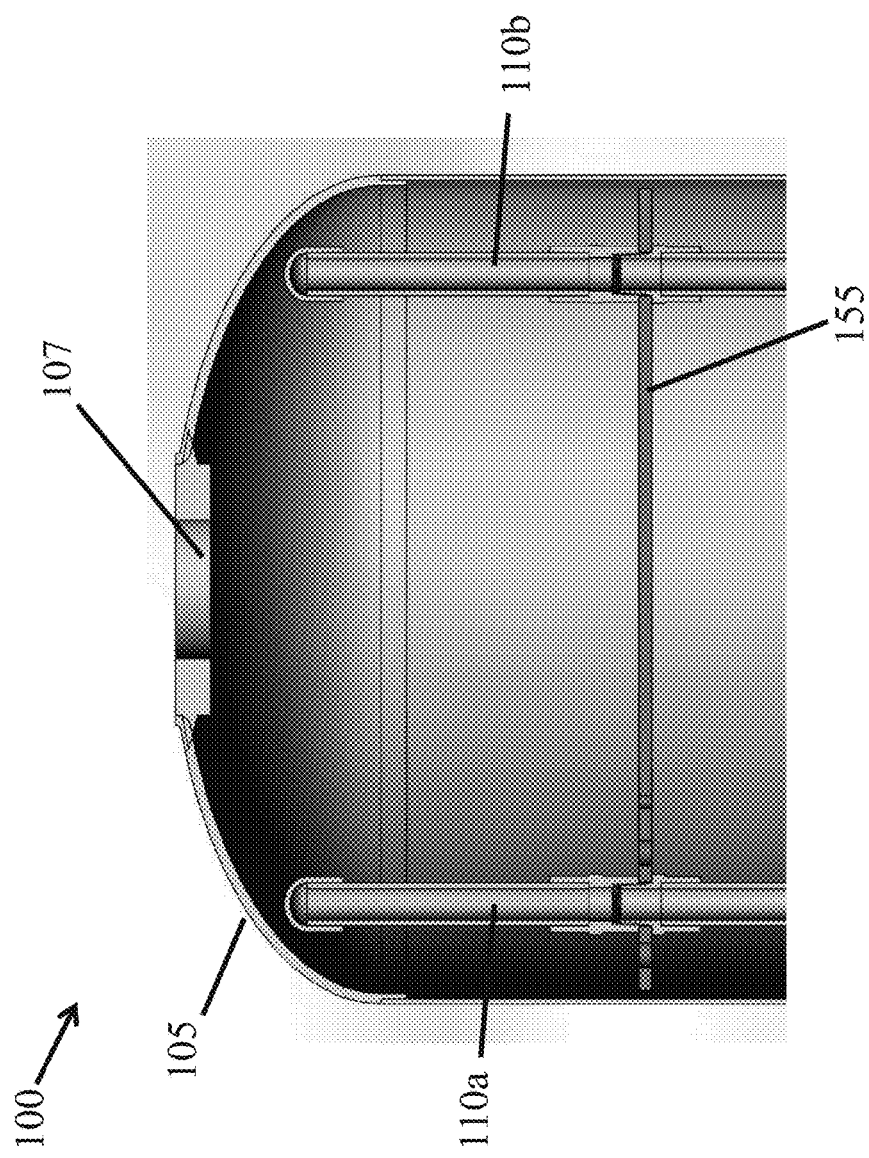
FIG. 13 is a diagram of an upper portion of a water treatment system assembly in accordance with one or more aspects of the disclosure.

FIG. 13 shows a top side view portion of the water treatment assembly 100 shown in FIGS. 2A, 2B, 3A, 3B, 4-7, 8A, 8B, and 9 and discussed above. As shown, the top of each of flow structures 110a and 110b is capped off or otherwise closed. Although not shown in FIG. 13, either one or both of flow structures 110a and 110b may contain holes positioned to assist in directing fluid flow. A baffle 155 is also positioned in between flow structures 110a and 110b, and as shown, is attached to each of them so that it does not make contact with the interior surface of the tank 105. Further, the left side of baffle 155 contains a plurality of perforations, which also assist in directing fluid flow within the tank 105. The top port 107 of tank 105 is open to the interior volume of the tank 105, thereby allowing for the removal of fluid(s) stored within. For example, a valve or other mechanical device may be positioned into the top port 107 to allow for removal of one or more fluids from within the tank 105.

Figure 14:
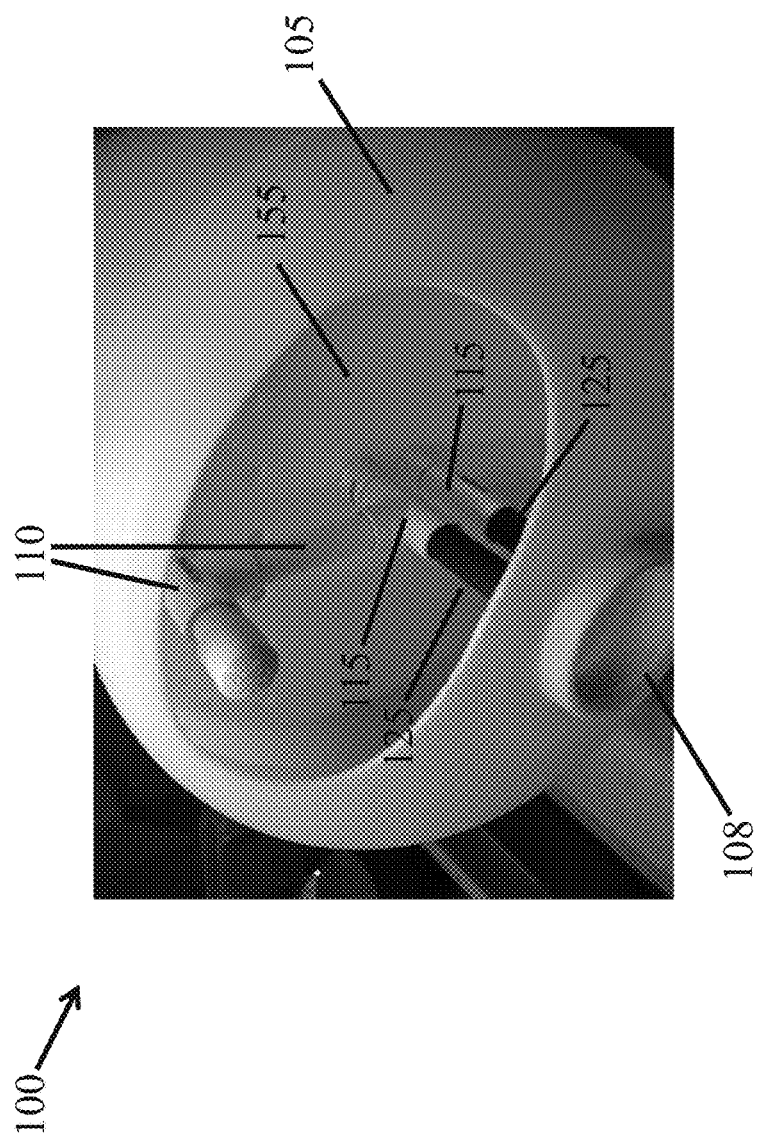
FIG. 14 is a bottom perspective view of a partially assembled water treatment system assembly in accordance with one or more aspects of the disclosure.

FIG. 14 is a bottom perspective view of the interior of a tank 105 in the water treatment assembly 100 shown and discussed above in reference to FIGS. 2A, 2B, 3A, 3B, 4-7, 8A, 8B, 9 and 13. A portion of the tank 105 has been removed, thereby allowing a view of the flow structure 110, riser pipes 115, connector tubes 125, baffle 155, and bottom port 108 of the water treatment assembly 100. As shown, the connector tubes 125 are configured to mate or otherwise attach to the riser pipes 115. As shown, the connector tubes 125 are already positioned within the tank 105 before the head fitting and the other portions of the telescopic fitting are attached. Further, the connector tube 125 may be fastened to riser pipe 115 before the dome of the tank is welded to the tank shell. FIG. 14 also shows that the flow structure 110 includes a horizontal component that connects one of the riser pipes 115 to a vertical component of the flow structure 110. The baffle 155 is also configured to allow for the riser pipes 115 to extend through the center portion of the baffle 155.

FIGS. 15A and 15B show a water treatment assembly 100 similar to the one depicted in FIGS. 2A, 2B, 3A, 3B, 4-7, 8A, 8B, 9, 13, and 14, but with an illustration of the holes or perforations 112 positioned in the vertical components of the flow structure 110. Although shown in the vertical components, the perforations may also be positioned in the horizontal components too, such as the portion that connects to the riser pipe 115. FIG. 15A shows a complete tank 105 with the inclusion of a top port 107 and FIG. 15B shows an enlargement of the circled portion of FIG. 15A. As shown in FIG. 15A, the water treatment assembly may further include one or more support structures 160, such as the threaded plug and threaded rod positioned within the center of the threaded plug and extending down into the interior of the tank. These structures function to stabilize the internal components of the tank and protect them from getting damaged during shipment and/or operation. For instance, the threaded rod may be tightened against the top baffle so that the structures positioned within the interior of the tank do not move around during shipping. During installation, the plug and rod maybe removed and replaced with a fitting suitable for connecting the tank to external piping. For example, the top port 108 of the tank 105 may be fitted with a valve that is fluidly connected to the interior volume of the tank and therefore configured to remove fluid from within the tank 105. According to another embodiment, a fitting may be attached to the top port 108 of tank 105 that is configured to be tightened against one or more of the internal structures of the tank to prevent vertical movement, but still allows fluid to be removed from the interior of the tank. Thus, this type of fitting does not have to be removed during installation.

Referring to FIG. 15B, fluid passageway 145a may be in fluid communication with the outlet of one or more depletion compartments of an electrochemical device. This processed fluid flows in through the inlet and outlet of fluid passageway 145a and moves up through the pipe receptor 135a and connector tube 125a of the telescopic fitting 120, and then into the horizontal and vertical components of the flow structure 110. As shown, the riser pipes 115a and 115a are capped off at the top, so that fluid flowing into these regions is contained. The fluid entering fluid passageway 145a then proceeds to travel up through the vertical component of the flow structure 110a, shown on the left side of the tank 105, and exits out into the interior volume of the tank through the one or more perforations 112 extending along the length of the pipe that forms the vertical component. The perforations 112 may be positioned on the components of the flow structure so as to enable fluid to pass through in any desired direction. Thus, the perforations 112 may be positioned on one side of the components, to direct fluid into or out of the center region of the interior of the tank, or all around the components so as to direct fluid into or out of all interior regions of the tank. The perforations 112 may be of any size or shape, similar to the perforations as discussed above in reference to the baffles. As discussed above in reference to FIG. 13, the top of the vertical component 110a is capped off, thus allowing pressure to build within the vertical component, forcing the fluid to exit out to the interior of the tank. In a similar, but opposite manner, fluid passageway 145b is in fluid communication with the fluid within the interior volume of the tank 105. Fluid within the interior volume of tank 105 enters through the perforations 112 of vertical component 110b that extend along the length of the pipe that form the vertical component, and travel downward through the horizontal component of the flow structure 110b and through connector tube 125b and riser pipe 135b of telescopic assembly 120 before passing through the inlet and outlet of fluid passageway 145b of head fitting 140. Fluid exiting fluid passageway 145b may be in fluid communication with the inlet to one or more dilution compartments of an electrochemical device. As described previously, head fitting 140 also includes fluid passageway 150, where a feed stream enters the interior volume of the tank 105 in between the fluid passageways 145a and 145b. As explained further below, the feed stream follows a tortuous flowpath, such as a serpentine route, through the tank 105 via the use of the baffles 155.

FIGS. 16A and 16B are cross-sectional views of the water treatment assembly 100 shown in FIGS. 15A and 15B and include the tank 105, flow structure 110, baffles 155, riser pipe 135, connector tube 125, and head fitting 140 as previously described and discussed, where FIG. 16B is an enlarged view of the circled portion of FIG. 16A. According to one or more embodiments, the water treatment assembly 100 may be configured to provide a substantially vertical plug flow of fluid from one side of the tank to the other. For example, fluid exiting the perforations 112 of vertical component 110a enters the interior volume of the tank 105 and moves across the tank in a substantially vertical "wall" toward vertical component 110b with the assistance of the parallel and horizontally extending baffles 155. The panel-like structures of the baffles 155 confine the water exiting the perforations 112 of the vertical components of the flow structure 110 into a series of vertically stacked "sections." Once fluid reaches the vertical component 110b on the other side of the tank 105, it flows in through the perforations 112 of flow structure 110b and travels downward, to exit out through fluid passageway 145b, as previously discussed. According to at least one embodiment, one or more pumps, as discussed below in reference to FIG. 1, may be used to assist in this fluid flow pattern.

The water treatment assembly 100 is also configured to provide a substantially horizontal plug flow of fluid from the bottom to the top of the tank 105. For example, one or more fluids may enter through the bottom of the tank 105, such as the feed liquid entering through feed passageway 150 of head fitting 140. The presence of the baffles 155 forces the water to flow in a tortuous flow path, which functions to limit the amount of mixing between the processed fluid exiting the flow structure 110 and the unprocessed feed liquid, since the interface between these two liquids within the tank is decreased. As used herein, the term "tortuous flow path" refers to any flow path having multiple changes of direction so as to inhibit flow of one or more fluids through the vessel. For example, the flow path may be characterized as serpentine, where the directly is gradually (usually a plurality of 90 to 180 degree interfaces at section borders) or immediately (using at least one acute angle section interface) partially reversed at least once in a v-like or s-like pattern, and usually multiple times in an undulating pattern. The tortuous flow path has the effect of horizontally extending the flow path through the vessel while preventing backmixing and crossmixing of the one or more fluids within the vessel. The feed liquid travels upward in the tortuous flow path until it reaches the top port 107 of the tank 105 by moving upward through the holes or perforations positioned in the baffles 155. The holes in the baffles are positioned at opposite sides in adjacently stacked baffles, so fluid is forced up through the holes on one side of the first baffle, and hits the "non-hole" side of the second baffle positioned directly above the first baffle. This forces the fluid to move between the two baffles until it reaches the holes in the second baffle, where the process repeats itself with a third baffle positioned vertically adjacent the second baffle. Further, feed liquid enters through the bottom port 108 via pressure created by incoming feed liquid from a point of entry. The incoming feed liquid may subsequently push processed water residing in an upper region of the tank and out of the top port 107 of the tank 105.

Figure 17B:
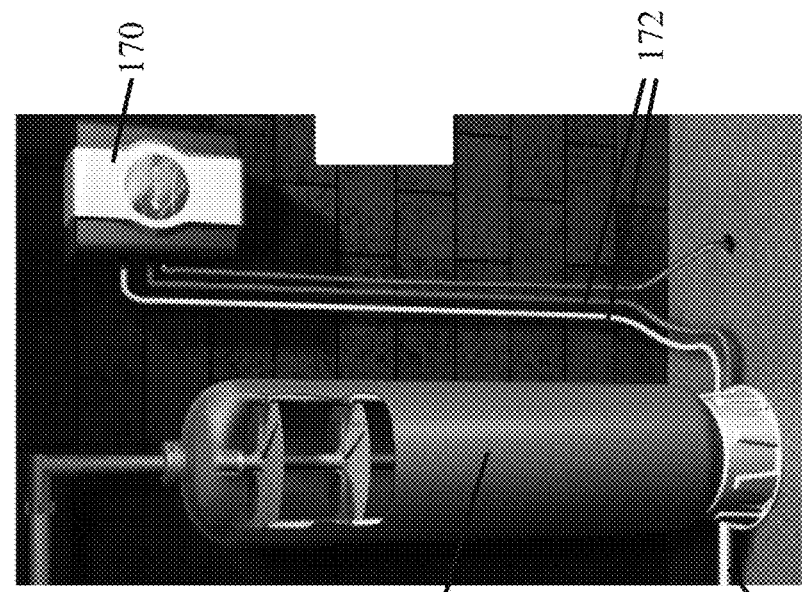
FIG. 17B is a diagram of a water treatment assembly in accordance with another aspect of the disclosure.
Figure 17A:
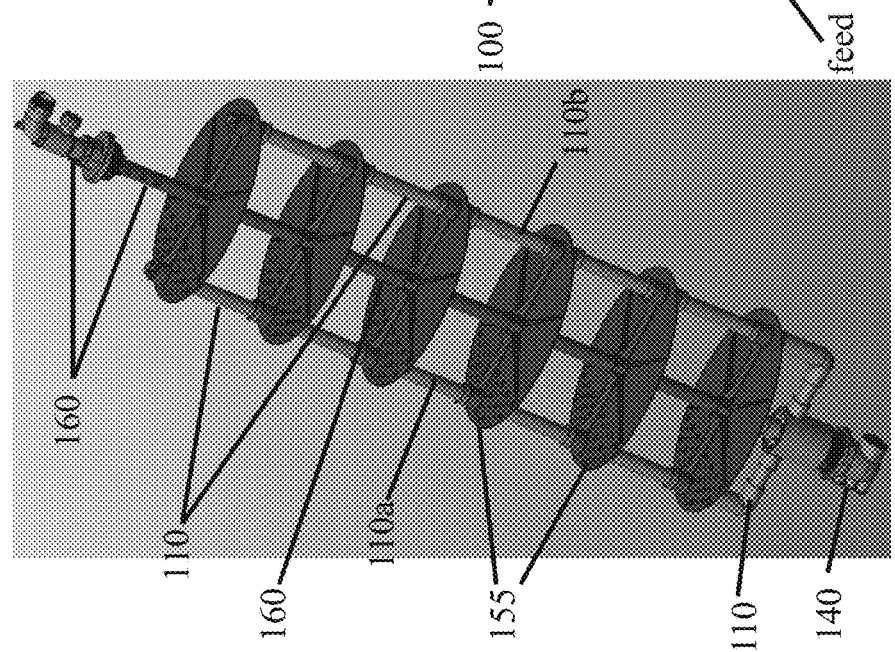
FIG. 17A is a diagram of a water treatment assembly in accordance with another aspect of the disclosure.

Referring to FIGS. 17A and 17B, an additional embodiment of a water treatment assembly 100 is shown that shows another example of a flow structure 110 and baffles 155. FIG. 17A includes a flow structure 110 attached to a head fitting 140 and a support structure 160, including a central pipe or rod. Although in this embodiment the central rod functions as part of the support structure 160, in other instances this feature may be used to introduce or remove tank contents during assembly, maintenance, or disassembly procedures. The flow structure 110 includes two vertical components and a series of parallel baffles 155 that are arranged in a vertical configuration in the tank, much in the same way as described above in reference to FIGS. 15A, 15B, 16A, and 16B. One or more components of the flow structure 110 may also include perforations (not shown), as discussed above, that allow fluid to enter or exit the flow structure. Further, the baffles include one or more perforations that are positioned at one side of baffle. According to this embodiment, the baffles are arranged such that the one or more perforations of each baffle line up with one another. For instance, a first baffle is positioned such that the one or more perforations are positioned proximate one side of the tank, and the first baffle is positioned horizontally above a second baffle that is positioned such that the one or more perforations of the second baffle are positioned proximate the same side of the tank; i.e., the perforations of the second baffle are positioned below the perforations of the first baffle. Thus, as shown in FIG. 17A, the left side of each baffle contains perforations, while the right side of the baffles is solid material. This configuration may allow fluid exiting perforations formed in a first portion 110a of the flow structure to flow upward (using the perforations in the baffles 155) and allow fluid to flow into perforations formed in the second portion 110b of the flow structure and downward; thereby created a "plug" flow as described above in reference to FIGS. 16A and 16B.

FIG. 17B shows the incorporation of the flow structure 110 and other components of FIG. 17A into a tank to form a complete water treatment assembly 100 that is fluidly connected to an electrochemical device 170. For example, one or more fluid lines 172 may be fluidly connected to different ports of the head fitting 140. For instance, as described above, the outlet of one or more depletion compartments of the electrochemical device 170 may be connected to a first port of the head fitting 140 that in turn connects to a first portion of the flow structure 110, and the inlet of one or more depletion compartments of the electrochemical device 170 may be connected to a second port of the head fitting 140 that in turn connects to a second portion of the flow structure 110. A source of feed liquid may also be connected to a third port of the head fitting 140, as discussed and described above.

Example Water Treatment System

According to various embodiments, the water treatment assemblies disclosed herein may be used as part of a larger water treatment system. For example, FIG. 1 is a process flow diagram of a treatment system 30 that may be used in accordance with one or more embodiments disclosed herein. For example, the water treatment assembly may be used as a storage system 380, as discussed below. A liquid circuit is illustrated where a feed stream 304 is introduced to treatment system 30. The feed stream 304 may be in fluid communication with a water source. Non-limiting examples of the water source include potable water sources, for example, municipal water, well water, and non-potable water sources, for example, brackish or salt-water, pre-treated semi-pure water, and any combination thereof. In some instances, a treatment system, for example, a purification system, and/or a chlorine removal system, treats the water before it comprises the feed stream. The feed stream 304 may contain dissolved salts or ionic or ionizable species including sodium, chloride, chlorine, calcium ions, magnesium ions, carbonates, sulfates or other insoluble or semi-soluble species or dissolved gases, such as silica and carbon dioxide. The feed stream may also contain additives, such as fluoride, chlorate, and bromate species.

In accordance with one or more embodiments, treatment system 30 includes a fluid distribution system. The distribution system comprises components that are fluidly connected to provide fluid communication between components of the treatment system, for example, providing fluid communication between treated water from storage system 380, to product stream 360. The distribution system can comprise any arrangement of pipes, valves, tees, pumps, manifolds, and any combination thereof, to provide fluid communication throughout treatment system 30 and throughout one or more product streams or storage systems available to a user. In certain embodiments, the distribution system further comprises a household or residential water distribution system including, but not limited to, connections to one or more points of use such as, a sink faucet, a showerhead, a washing machine, and a dishwasher. For example, treatment system 30 may be connected to the cold, hot, or both, water distribution systems of a household. Pumps and vacuum sources may be in fluid communication with various components of the fluid distribution system for purposes of controlling liquid flow by pressurizing the liquid. The pressurized liquid stream may further comprise a regulator where the pressure can be more readily controlled. Fluid may also be caused to flow by gravity.

The liquid circuit may further comprise one or more bypass valves 312 which may allow liquid to flow through one part of water treatment system 30 and prevent flow through another part of the system. For example, bypass valve 312 may function to allow fluid from feed stream 304 to bypass water treatment system 30 and exit with product stream 360, or conversely allow feed stream 304 to flow into the water treatment system through valve 302, flowmeter 316, and pre-filter 305.

Pre-filter device 305 may be a preliminary filter or pre-treatment device designed to remove a portion of any undesirable species from the water before the water is further introduced into one or more components of treatment system 30. Non-limiting examples of pre-filter devices include, for example, carbon or charcoal filters that may be used to remove at least a portion of any chlorine, including active chlorine, or any species that may foul or interfere with the operation of any of the components of the treatment system process flow. Additional examples of pre-treatment devices include, but are not limited to, ionic exchange devices, mechanical filters, and reverse osmosis devices. Pre-treatment systems can be positioned anywhere within treatment system 30. For example, water that enters storage system 380 after being treated by electrochemical device 300 may contain little or no chlorine (or any other alternative disinfectant). To retain a residual chlorine level in storage system 380, the water can be mixed with untreated water from feed stream 304. Preferably, the chlorinated water is added at a rate adequate to result in mixed water that contains enough chlorine to inhibit bacteriologic activity. Active chlorine refers to chlorine containing species that exhibit anti-microbial activity. An effective chlorine concentration is defined herein as a concentration of active chlorine compounds, for example, sodium hypochlorite that inhibits the growth of bacteria, such as *e-coli*, in storage system 380. Therefore, the ratio at which the feed water and treated water are mixed in storage system 380 may be dependent upon a number of factors, including the efficiency of electrochemical device 300, the desired effective chlorine concentration, the rate at which water contained in storage system 380 is depleted, the temperature of storage system 380, and the source and quality of the feed water. Pre-treatment devices may also be, for example, a particulate filter, aeration device, and one or more filters, such as chlorine, manganese, iron, silica, etc. Further, the pre-treatment device may comprise several devices, or a number of devices arranged in parallel or in a series.

Electrochemical device 300 may include ion-depleting (depleting) compartments and ion-concentrating (concentrating) compartments. Adjacent compartments may have an ion-selected membrane positioned therebetween. The assembly of concentrating and depleting compartments, which may be named the stack, may be in alternating order or in any of various arrangements necessary to satisfy design and performance requirements. The stack arrangement may be bordered by an electrode compartment at one end and another electrode compartment at an opposite end. The end blocks may be positioned adjacent to end plates housing an anode and a cathode in respective electrode compartments. The concentrating and depleting compartments may be defined by spacers or structures that offset and support ion selective membranes or selectively permeable membranes. The spacer, along with the selective membrane bonded thereon, define a cavity which may serve as a concentrating or a depleting compartment, depending on operating conditions as explained below.

The electrochemical device 300 may be any electrochemical device and includes any treatment apparatus or system that purifies or treats a fluid, such as water, by removing, at least partially, any undesirable species, such as hardness-causing species. Examples of such electrochemical devices include electrode ionization devices, electrodialysis devices and capacitive deionization devices. As recognized by one of ordinary skill in the art, the systems and techniques disclosed herein may utilize other treatment apparatuses or systems. For example, the treatment system may utilize a reverse osmosis apparatus as a treatment device.

In operation, the feed stream 304 to be treated has dissolved cationic and anionic species, including hardness ion species, which are then treated or demineralized in electrochemical device 300. The produced treated liquid may then be transferred and stored in storage system 380. Treated liquid in storage system 380, or at least a portion thereof, may be transferred to product stream 360.

Liquid to be treated may enter electrochemical device 300 through a depleting compartment. An electric field may be applied across the stack through the electrodes. The applied electric field creates a potential that attracts cationic and anionic species to their respective electrodes. In this way, the cationic and anionic species migrate toward their respective attracting electrodes from the depleting compartment to adjacent compartments, which, in some embodiments, are concentrating compartments. Selectively permeable membranes between compartments may serve as barriers that prevent further migration of ionic species into the next compartment. Thus, the ionic species from a liquid flowing in a depleting compartment may be trapped in an adjacent or nearby concentrating compartment, thereby creating a treated liquid exiting the former compartment and a concentrate stream exiting the latter compartment.

In accordance with certain embodiment, treatment system 30 also includes one or more probes or sensors 306, for example, a water property sensor, capable of measuring at least one physical property in treatment system 30. For example, the sensor 306 can be a device that measures water conductivity, pH, temperature, pressure, composition, and/or flow rates. The probe or sensor can be installed or positioned within treatment system 30 to measure a particularly preferred water property. For example, a probe or sensor 306, can be a water conductivity sensor installed in or otherwise placed in fluid communication with storage system 380 so that it measures the conductivity of the water. This may provide an indication of the quality of water available for product stream 360. In another embodiment, the probe or sensor can comprise a series or a set of sensors in various configurations or arrangements in treatment system 30. The set of sensors can be constructed, arranged, and connected to a controller so that the controller can monitor, intermittently or continuously, the quality of water in, for example, storage system 380. This arrangement allows the performance of treatment system 30 to be further optimized. The sensor 306 may also be configured to report or otherwise communicate the measured value to a control system, as discussed further below.

In accordance with other embodiments of the systems and methods described herein, treatment system 30 may include a combination of sets of sensors in various locations in the liquid streams or other components throughout treatment system 30. For example, the probe or sensor can be a flow sensor measuring a flow rate from feed stream 304, and can further include any one or more of a pH meter, a nephelometer, a composition analyzer, a temperature sensor, and a pressure sensor monitoring the operating conditions of treatment system 30.

Storage system 380 may store or accumulate water from feed stream 304 and may also serve to store treated water for product stream 360 and may further provide water to electrochemical device 300. In accordance with some embodiments of the systems and methods described herein, storage system 380 comprises a tank, vessel or reservoir that has inlets and outlets for fluid flow. In certain non-limiting embodiments, the storage system comprises a tank that has a volume capacity in a range of from about 0.1 gallons to about 1000 gallons. According to a further embodiment, the tank has a volume capacity in a range of from about 5 gallons to about 200 gallons. In certain non-limiting embodiments, storage system 380 may comprise several tanks or vessels, and each tank or vessel, in turn, may have several inlets and/or outlets positioned at various locations. The inlets and outlets may be positioned on each vessel at various locations depending on, among other things, the demand and flow rate to product stream 360, the capacity or efficiency of electrochemical device 300, and the capacity or hold-up of storage system 380.

Storage system 380 may further comprise various components or elements that perform desirable functions or avoid undesirable consequences. For example, the tanks or vessels may have internal components, such as baffles, that are positioned to disrupt any internal flow currents or areas of stagnation. In some embodiments, storage system 380 further comprises a heat exchanger for heating or cooling the stored fluid. For example, storage system 380 may comprise a vessel constructed with a heating coil that may include heating fluid and is configured to elevate the temperature of the fluid in the vessel via heat transfer methods. In some instances, the heating fluid may be hot water in a closed-loop flow with a furnace or other heat-generating unit so that the heating fluid temperature is raised in the furnace. Other examples of auxiliary or additional components include, but are not limited to, pressure relief valves designed to relieve internal pressure in the storage system. In accordance with further embodiments, the treatment system can comprise at least two tanks or vessels or two zones in one or more tanks or vessels, each of which can be, at least partially, fluidly isolated from the other. For example, the treatment system can comprise two vessels fluidly connected to a feed stream and to one or more treatment devices. The two tanks or vessels can be fluidly isolated from each other by conduits and valves so that the first can be placed in service with one or more treatment devices while the second can be removed from service to, for example, perform maintenance or cleaning activities. In accordance with one or more embodiments of the systems and methods described herein, the tank or reservoir system is connected to, or in thermal communication with, a heat exchanger and, optionally, to a fluid treatment device. In certain instances, the fluid treatment device may be an electrochemical device, as described above.

In certain embodiments, liquid exiting electrochemical device 300 as dilution stream 330 may be directed by valve 312 to storage system 380. In addition, storage system 380 may store or accumulate water from feed stream 304. Thus, storage system 380 may include treated water as well as untreated, or minimally treated, water. Storage system 380 may be configured so that these two sources of water are mixed together, or alternatively, the two water sources may be segregated. For example, one source of water may enter the bottom of storage system 380 through one or more inlets and proceed in a plug-flow manner in an upward direction to one or more outlets positioned at the top of storage system 380.

In various embodiments, a dilution stream 330 may flow in a circulating loop through electrochemical device 300. The circulating dilution stream may provide fluid communication between one or more depletion compartments in electrochemical device 300 and storage system 380 Likewise, a concentrate stream 310 may flow in a circulating loop through electrochemical device 300 and may be in fluid communication with one or more concentration compartments of electrochemical device 300.

Water treatment system 30 may further include one or more gate valves 302 and flow meters 308. For example, the fluid path flowing from storage system 380 to product stream 360 may include gate valve 302, flow meter 308, and one or more sensors 306, such as an ionic conductivity probe. In one or more embodiments, concentrate stream 310 may include water from concentrate make-up stream 314 that is fed from feed stream 304 and passes through pre-filter 305. A valve (not shown) may be positioned at the junction of the concentrate make-up stream 314 and concentrate stream 310.

In certain non-limiting embodiments, the valve 312 may be a solenoid valve. The solenoid valve may be a one-way or multi-way valve, including three-way and four-way valves. The solenoid valve may be an on/off type of valve, a proportional type of valve, and any combination thereof. For example, a first four-way solenoid valve 312a may include a first port that is in fluid communication with an inlet to one or more concentration compartments of electrochemical device 300 and a second port may be in fluid communication with an outlet to one or more concentration compartments of electrochemical device 300. A third port may be in fluid communication with an inlet to one or more dilution compartments of electrochemical device 300. A second four-way solenoid valve 312b may be positioned downstream of one or more outlets of electrochemical device 300. For example, a first and second port of valve 312b may be in fluid communication with an outlet of concentration and dilution chambers of electrochemical device 300, and feed the concentrate stream and dilution stream respectively.

In one or more embodiments, a control system may be in communication with a multi-way valve. The three-way solenoid valve may allow either one of two incoming fluids to be directed to an outlet. When the valve is in the "off" position, fluid flow from one of the incoming fluid streams may be interrupted. When the valve is in the "on" position fluid flow from the other incoming fluid stream may be interrupted. For example, first valve 312a may be used to direct fluid flow from concentrate stream 310 and storage system 380 to electrochemical device 300. The exact selection of which or both of these streams may be used may be controlled by one or more components of the control system.

Treatment system 30 may further comprise a liquid circuit that allows fluid communication between one or more outlets of electrochemical device 300, and storage system 380. For example, one or more ports of first valve 312a may be in fluid communication with at least one outlet of electrochemical device 300. In certain embodiments, the outlet of the electrochemical device 300 comprises ion-depleted water from one or more dilution compartments of electrochemical device 300. At least one port of first valve 312a may be in fluid communication with a sensor 306, for example, an ionic conductivity probe. The liquid circuit may also be in fluid communication with at least one inlet to storage system 380. An outlet of storage system 380 may be in fluid communication with at least one inlet to electrochemical device 300. The liquid circuit may include one or more pumps 350 to aid in directing fluid throughout the treatment system 30, for example, for directing fluid into one or more inlets of electrochemical device 300.

The systems and methods described herein further provide a treatment system where a controller may provide a signal that actuates a valve so that fluid flow is adjusted based on a variety of operating parameters. These parameters may include, but are not limited to, the properties of water from feed stream 304, the properties of water in storage system 380, the properties of water in dilution stream 330, the properties of water in concentrate stream 310, and any combination thereof. Other parameters may include the properties of water exiting storage system 380, the demand of water necessary to provide to product stream 360, the operating efficiency or capacity of electrochemical device 300, the operating parameters associated with electrochemical device 300, and any combination thereof. Specific measured parameters may include, but are not limited to, water conductivity, pH, turbidity, composition, temperature, pressure, flow rate, and any combination thereof.

In one or more embodiments, a controller may receive signals from one or more sensors so that the controller is capable of monitoring the operating parameters of treatment system 30. For example, a conductivity sensor may be positioned within storage system 380 so that the conductivity is monitored by the controller. In one or more embodiments, a controller may receive a signal from one or more sensors so that the controller is capable of monitoring the operating parameters of the dilution stream, such as conductivity. In operation, the controller may increase, decrease, or otherwise adjust the voltage, current, or both, supplied from a power source to one or more components of the treatment system. The controller may include algorithms that may modify an operating parameter of treatment system 30 based on one or more measured properties of the liquid flowing in the system. According to certain embodiments, the controller reverses the polarity of the electrochemical device 300 so that the concentrating and depleting compartments are switched, and thus the concentrating stream becomes the dilution stream. The controller may also function to activate a valve that controls the flow of discharge stream 320 to exit the system. According to another example, during processing, the controller allows water to continuously flow through the dilution and concentrating streams, and when the controller determines that the system is done processing water (i.e., by using a measured system parameter, such as receiving a measurement that indicates the tank water quality has reached a desired level, performing a calculation, receiving a command from a user), the controller stops or otherwise halts the flow of one or more of the fluid streams.

The controller may be configured, or configurable by programming, or may be self-adjusting such that it is capable of maximizing any of the service life, the efficiency, or reducing the operating cost of treatment system 30. For example, the controller may include a microprocessor having user-selectable set points or self-adjusting set points that adjust the applied voltage, current, or both, to valve(s) 312, and otherwise stop or start the process, thereby stopping or starting the flow of the concentrate stream 310, and/or the flow of discharge stream 320.

In accordance with another embodiment of the systems and methods described herein, the controller regulates the operation of the treatment system by incorporating adaptive or predictive algorithms, which are capable of monitoring demand and water quality and adjusting the operation of any one or more components of the treatment system 30. For example, in a residential application, the controller may be predictive in anticipating higher demand for treated water during early morning hours to supply product stream 360 that services a showerhead.

In certain non-limiting embodiments, valves 312 may be actuated to provide liquid to be treated from storage system 380 to electrochemical device 300 and transfer the treated liquid to storage system 380. In some arrangements, the liquid circuit may include connections so that untreated liquid may be mixed with liquid that would exit any of the electrode compartments of electrochemical device 300. In several embodiments, the liquid circuit may further include connections to and from storage system 380 so that, for example, treated liquid exiting the depleting compartment of electrochemical device 300 may be transferred to storage system 380 and mixed with untreated liquid from feed stream 304. The resulting mixture may be delivered to product stream 360, and, optionally, to the one or more ion exchange membranes of the electrochemical device 300 in parallel or series flow paths.

In accordance with another embodiment of the systems and methods described herein, a controller, through a sensor or set of sensors, may monitor or measure at least one water property of the water storage system 380 and also measure a flow rate flowing in product stream 360. The controller may adjust an operating parameter of electrochemical device 300 and/or valves 312a and 312b based on the measured properties. In one or more embodiments of the systems and methods described herein, one or more sensors may measure at least one property of feed stream 304 and water in storage system 380.

In certain embodiments, storage system 380 may be connected downstream of feed stream 304 and may be in fluid communication with electrochemical device 300. For example, water from feed stream 304 may flow in and mix with the bulk water contained within storage system 380. Bulk water may exit storage system 380 and be directed to product stream 360 or exit through and be directed through valve 312a into electrochemical device 300 for treatment. In certain embodiments, treated water leaving electrochemical device 300 may mix with water from feed stream 304 by entering storage system 380. In this way, a liquid circuit may be formed between storage system 380, electrochemical device 300 and feed stream 304, and may function as a method for replenishing the water leaving the system 30 via product stream 360.

The water treatment assembly is capable of being used for a variety of different purposes. For instance, the water treatment assembly may be used in applications or processes for storing fluid, including two or more different types or kinds of fluids. For instance, the two or more fluids may be water of different hardness (or any other physical property), or may be completely different types of fluids, such as water and chlorine. In certain configurations, mixing between two or more different types of fluid is minimized. Further, the residence time of one or more fluids stored in the tank may be increased in comparison to other systems that don't include one or more features of the disclosed systems.

According to one example, the water treatment assembly may function as a water softener, where the tank is in communication with rechargeable ion exchange resin(s). For instance, the tank may contain the ion exchange resin(s). The resins include cation resins, such as sodium, and anion resins, such as chloride. As water passes through the resin bed, hardness-contributing species such as calcium and magnesium are exchanged for sodium, thereby softening the water. According to this embodiment, the water treatment assembly, including the tank, may minimize the discharge of brine from the system during regeneration of the ion exchange resins. Further, the water treatment assembly may be used as part of the media regeneration process, since the high residence time results in longer contact times with regenerating species, resulting in a more efficient process that reduces energy, time and/or waste.

According to another example, the water treatment assembly may be used in a chemical process. For example, the tank and one or more of the fittings and the flow structure may be used in a chemical plug flow reactor. According to this embodiment, the water treatment assembly may increase reaction efficiencies of one or more processes associated with the reactor.

According to another example, the tank of the water treatment assembly may include an electrochemical device, as described above. For example, one or more components of the electrochemical device may be positioned within the tank, and in some instances, the tank may further include at least one of the concentrating and dilution streams. According to this embodiment, the tank is under pressure, which may function to apply pressure to the exterior walls of the electrochemical device. This pressure allows for the electrochemical device to not open during operation, but still allow flow to pass through the device. This arrangement allows for a cheaper enclosure to be placed around the electrochemical device, which reduces manufacturing costs.

According to another example, the water treatment assembly may be used in a wastewater treatment system, for example as part of an activated sludge aeration process. For example, the activated sludge and aeration process may occur in the tank, where one portion of the tank may function as the aeration zone, another portion may have the activated sludge, and one or more other portions may be used as settling zones and recirculation zones, including moving treated water out of the tank.

According to another example, the water treatment assembly may be used to introduce one or more heated fluids into the tank, for instance, through the fluid passageways of the head fitting and one or more portions of the flow structure and/or interior volume of the tank. For example, heated fluid may be introduced through the flow structure, where it may exit the perforations and enter the greater volume of the interior volume of the tank, thereby making contact with a fluid already present within the interior of the tank. In the alternative, a cooled fluid may be introduced into the tank.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

The invention claimed is:

1. A water treatment assembly comprising:
    a tank comprising an interior volume and an aperture positioned at a first end;
    a flow structure positioned within the interior volume of the tank, the flow structure comprising:
        a plurality of first fluid passageways;
        a first riser pipe in fluid communication with the plurality of first fluid passageways;
        a plurality of second fluid passageways; and
        a second riser pipe in fluid communication with the plurality of second fluid passageways;
    a first telescopic fitting comprising a first telescopic portion and a second telescopic portion, the first telescopic fitting in fluid communication with the first riser pipe;
    a second telescopic fitting comprising a first telescopic portion and a second telescopic portion, the second telescopic fitting in fluid communication with the second riser pipe; and
    a head fitting moveably mounted in the aperture, the head fitting comprising:
        a first port in fluid communication with the first telescopic fitting;
        a second port in fluid communication with the second telescopic fitting; and
        a third port in fluid communication with a source of feed water and the interior volume of the tank.

2. The water treatment assembly of claim 1, wherein the second telescopic portions of the first and the second telescopic fittings are configured to engage with the first riser pipe and the second riser pipe, respectively.

3. The water treatment assembly of claim 2, wherein the second telescopic portions of the first and the second telescopic fittings comprises a connector tube.

4. The water treatment assembly of claim 2, wherein the first telescopic portion of the first telescopic fitting is configured to engage with the first port of the head fitting, and the first telescopic portion of the second telescopic fitting is configured to engage with the second port of the head fitting.

5. The water treatment system of claim 4, wherein the first telescopic portions of the first and the second telescopic fittings comprises a pipe receptor.

6. The water treatment assembly of claim 4, wherein a portion of the head fitting is positioned exterior to the tank when the head fitting is mounted in the aperture and the first and the second telescopic fittings have engaged with the first and the second ports, respectively.

7. The water treatment assembly of claim 4, wherein the flow structure extends vertically along a length of the tank and is configured to rotate freely within the interior volume of the tank while the head fitting is mounted in the aperture.

8. The water treatment assembly of claim 7, wherein the tank further comprises an outlet in fluid communication with the interior volume and positioned at a second end.

9. The water treatment assembly of claim 4, wherein the head fitting further comprises a first fluid passageway connected to the first port and a second fluid passageway connected to the second port, wherein the plurality of first fluid passageways of the flow structure, the first riser pipe, the first telescopic fitting and the first fluid passageway of the head fitting define a first fluid flow path, and the plurality of second fluid passageways of the flow structure, the second riser pipe, the second telescopic fitting, and the second fluid passageway of the head fitting define a second fluid flow path.

10. The water treatment assembly of claim 9, wherein the first and the second fluid flow paths are in fluid communication with one or more depletion compartments of an electrochemical device.

11. The water treatment assembly of claim 10, wherein the first fluid flow path is connected to an outlet of the one or more depletion compartments of the electrochemical device, and the second fluid flow path is connected to an inlet of the one or more depletion compartments of the electrochemical device.

12. The water treatment assembly of claim 4, wherein the first port is in fluid communication with an outlet of one or more depletion compartments of an electrochemical device.

13. The water treatment assembly of claim 12, wherein the second port is in fluid communication with an inlet of one or more depletion compartments of an electrochemical device.

14. The water treatment assembly of claim 1, wherein the plurality of first fluid passageways is positioned on one side of the tank and the plurality of second fluid passageways is positioned on an opposite side of the tank.

15. The water treatment assembly of claim 1, wherein the telescopic fitting is configured to provide fluid communication between the flow structure and at least one fluid passageway positioned within the head fitting through the riser pipe.

16. The water treatment assembly of claim 1, wherein at least one of the plurality of first fluid passageways and the plurality of second fluid passageways includes one or more hollow vertical components.

17. The water treatment assembly of claim 16, wherein the one or more hollow vertical components comprise at least one perforation.

18. The water treatment assembly of claim 17, wherein at least one of the plurality of first fluid passageways and the plurality of second fluid passageways includes a horizontal component in fluid communication with at least one of the first riser pipe and the second riser pipe.

19. The water treatment assembly of claim 18, wherein the horizontal component comprises at least one perforation.

20. The water treatment assembly of claim 1, further comprising at least one of baffles, barriers, dispersers, and flow redistributors.

21. The water treatment assembly of claim 20, further comprising a plurality of baffles, wherein each baffle of the plurality of baffles is a horizontal tray comprising one or more perforations placed in one or more locations on the tray, the plurality of horizontal trays arranged in a vertical configuration.

22. The water treatment assembly of claim 21, wherein each baffle is substantially circular in shape with the one or more perforations positioned at one side of the tray.

23. The water treatment assembly of claim 18, wherein a first baffle of the plurality of baffles has the one or more perforations positioned proximate one side of the tank, the first baffle positioned horizontally above a second baffle of the plurality of baffles, the second baffle having the one or more perforations positioned proximate the same side of the tank.

24. The water treatment assembly of claim 23, wherein the one or more perforations of the second baffle are positioned proximate an opposite side of the tank.

25. The water treatment assembly of claim 20, wherein the at least one of the baffles, barriers, disperser, and flow redistributors is configured to prevent bacterial growth.

26. The water treatment assembly of claim 1, configured to operate at a line pressure of a water treatment system associated with the water treatment assembly.

27. A method for assembling a tank, comprising:
providing a tank comprising:
- a flow structure positioned within an internal volume of the tank, the flow structure including a first riser pipe and a second riser pipe;
- a first telescopic fitting comprising a first telescopic portion and a second telescopic portion, the first telescopic fitting configured to be in fluid communication with the first riser pipe; and
- a second telescopic fitting comprising a first telescopic portion and a second telescopic portion, the second telescopic fitting configured to be in fluid communication with the second riser pipe;

attaching a first port of a head fitting to the second portion of the first telescopic fitting;
attaching a second port of the head fitting to the second portion of the second telescopic fitting;
attaching the second portion of the first telescopic fitting to the first portion of the first telescopic fitting; and
attaching the second portion of the second telescopic fitting to the first portion of the second telescopic fitting.

28. The method of claim 27, further comprising attaching the head fitting to the tank.

29. The method of claim 27, wherein providing the tank includes providing the tank in at least two portions, the method further comprising:
attaching the first riser pipe of the flow structure to the first portion of the first telescopic fitting;
attaching the second riser pipe of the flow structure to the first portion of the second telescopic fitting;
attaching the flow structure, the first portion of the first telescopic fitting, and the first portion of the second telescopic fitting to at least one portion of the at least two portions of the tank; and
attaching the at least two portions of the tank to each other.

* * * * *